United States Patent
Yan et al.

(10) Patent No.: US 10,694,576 B2
(45) Date of Patent: Jun. 23, 2020

(54) RRC CONNECTION RELEASE METHOD, APPARATUS, AND DEVICE

(71) Applicant: Huawei Technologies Co., Ltd., Shenzhen, Guangdong (CN)

(72) Inventors: Le Yan, Shanghai (CN); Mingzeng Dai, Shanghai (CN); Min Huang, Shenzhen (CN); Hongping Zhang, Shanghai (CN); Yi Guo, Shenzhen (CN); Qinghai Zeng, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 35 days.

(21) Appl. No.: 16/015,867

(22) Filed: Jun. 22, 2018

(65) Prior Publication Data

US 2018/0302947 A1    Oct. 18, 2018

Related U.S. Application Data

(63) Continuation of application No. PCT/CN2015/098406, filed on Dec. 23, 2015.

(51) Int. Cl.
| | |
|---|---|
| H04W 76/30 | (2018.01) |
| H04W 76/27 | (2018.01) |
| H04L 5/00 | (2006.01) |
| H04W 28/02 | (2009.01) |
| H04W 88/02 | (2009.01) |

(52) U.S. Cl.
CPC .......... *H04W 76/30* (2018.02); *H04L 5/0055* (2013.01); *H04W 28/0278* (2013.01); *H04W 76/27* (2018.02); *H04W 88/02* (2013.01)

(58) Field of Classification Search
None
See application file for complete search history.

(56) References Cited

U.S. PATENT DOCUMENTS

| | | | |
|---|---|---|---|
| 2012/0033597 A1 | 2/2012 | Kim et al. | |
| 2013/0288679 A1 | 10/2013 | Yi et al. | |
| 2014/0057639 A1 | 2/2014 | Nanjaiah | |
| 2014/0092799 A1* | 4/2014 | Jain | H04W 28/08 370/311 |
| 2014/0140277 A1 | 5/2014 | Barrett | |
| 2017/0064611 A1* | 3/2017 | Aghili | H04W 4/00 |

FOREIGN PATENT DOCUMENTS

| | | |
|---|---|---|
| CN | 103313311 A | 9/2013 |
| CN | 103716912 A | 4/2014 |
| CN | 103733658 A | 4/2014 |
| EP | 2814289 A1 | 12/2014 |
| EP | 3337286 A1 | 6/2018 |
| WO | 2014/019139 A1 | 2/2014 |
| WO | 2017045149 A1 | 3/2017 |

\* cited by examiner

*Primary Examiner* — Saumit Shah
(74) *Attorney, Agent, or Firm* — Womble Bond Dickinson (US) LLP

(57) ABSTRACT

A radio release control (RRC) connection release method includes: sending, by user equipment (UE), a first message to a base station, where the first message carries a preset RRC release time determining parameter or a first RRC release time; if the UE adds the first RRC release time to the first message, setting, by the UE, timing duration of a first timer based on the first RRC release time, and starting the first timer; and releasing, by the UE, an RRC connection when the first timer expires.

14 Claims, 25 Drawing Sheets

RRC CONNECTION RELEASE METHOD, APPARATUS, AND DEVICE

CROSS-REFERENCE TO RELATED APPLICATIONS

This application is a continuation of International Application No. PCT/CN2015/098406, filed on Dec. 23, 2015, the disclosure of which is hereby incorporated by reference in its entirety.

TECHNICAL FIELD

The present application relates to the field of communications technologies, and in particular, to an RRC connection release method, apparatus, and device.

BACKGROUND

On an air interface, user equipment (UE) has two radio resource control (RRC) statuses: an idle state and a connected state. When the UE needs to perform service transmission, the UE first needs to set up a connection to a network side device, that is, RRC connection setup, and the UE enters a connected state from an idle state, and then transmits service data. When the UE completes service data transmission, if the UE in a connected state does not transmit data for a long time, an inactivity timer expires, and the UE needs to release the RRC connection to the network side device, that is, RRC connection release, and the UE enters an idle state from a connected state. When downlink data arrives or uplink data arrives, the UE needs to set up an RRC connection again. After data transmission is completed, if the UE does not transmit data for a long time, the inactivity timer expires, and the UE needs to release the RRC connection. Therefore, in a process of switching an air interface state of the UE, that is, in a process of switching between an idle state and a connected state, a large quantity of signaling overheads are generated.

Cellular Internet of Things (CIoT) is a new technology based on a Long Term Evolution (LTE) system. A requirement of the cellular Internet of Things for a data rate is not high, and therefore, the cellular Internet of Things can provide a larger coverage gain and connection capability. In the CIoT, a huge quantity of terminals mainly perform small-sized packet transmission, that is, data packets transmitted by the terminals are relatively small. As communication requirements frequently increase and a quantity of terminals increases, a quantity of signaling overheads generated in RRC connection setup and RRC connection release significantly increases, and a network side device also needs more processing resources to process the control signaling. As a result, the network side device is overloaded.

In the prior art, there is a method for reducing RRC signaling overheads in an RRC connection setup process for UE and an eNB. Specifically, after an RRC connection is released, the UE and the eNB still reserve context information of the UE. When downlink data arrives or uplink data arrives, the UE needs to enter a connected state again, and the UE and the eNB separately use the stored context information of the UE to set up an RRC connection. In a process of setting up the RRC connection between the UE and the eNB by using the method, operations such as security activation and bearer setup do not need to be performed again, thereby reducing signaling overheads in the RRC connection setup process, and reducing network load. After the UE completes data transmission, if the UE does not transmit data for a long time, an inactivity timer expires, and the UE releases the RRC connection, and stores context information of the current connection. However, a large quantity of signaling overheads are still caused in an RRC connection release process.

SUMMARY

Embodiments of the present disclosure provide an RRC connection release method, apparatus, and device, to resolve a problem that network load is heavy because a large quantity of signaling is required in an RRC connection release process.

Specific technical solutions provided in the embodiments of the present disclosure are as follows.

According to a first aspect, an RRC connection release method is provided, and the method includes:

sending, by user equipment UE, a first message to a base station, where the first message carries a preset RRC release time determining parameter or a first RRC release time;

if the UE adds the first RRC release time to the first message, setting, by the UE, timing duration of a first timer based on the first RRC release time, and starting the first timer; or if the UE adds the preset RRC release time determining parameter to the first message, receiving, by the UE, a response message fed back by the base station for the first message, where the response message carries a second RRC release time determined by the base station based on the preset RRC release time determining parameter, setting, by the UE, timing duration of the first timer based on the second RRC release time, and starting the first timer; and releasing, by the UE, an RRC connection when the first timer expires.

With reference to the first aspect, in a first possible implementation of the first aspect, the preset RRC release time determining parameter is a volume of to-be-sent uplink data of the UE and/or an estimated time of sending the to-be-sent uplink data.

With reference to the first aspect or the first possible implementation of the first aspect, in a second possible implementation of the first aspect, before the releasing, by the UE, an RRC connection when the first timer expires, the method further includes:

reporting, by the UE, a buffer status report BSR to the base station, where the BSR is used to instruct the base station to adjust timing duration of a second timer, and the timing duration of the second timer is set by the base station based on the first message sent by the UE; and receiving, by the UE, a first adjustment instruction returned by the base station, and adjusting the timing duration of the first timer based on the first adjustment instruction.

According to a second aspect, an RRC connection release method is provided, and the method includes:

receiving, by a base station, a first message sent by UE, where the first message carries a preset RRC release time determining parameter or a first RRC release time;

if the base station determines that the first message carries the first RRC release time, setting, by the base station, timing duration of a second timer based on the first RRC release time, and starting the second timer; or if the base station determines that the first message carries the preset RRC release time determining parameter, determining, by the base station, a second RRC release time based on the preset RRC release time determining parameter, adding the second RRC release time to a response message fed back to the UE for the first message, setting, by the base station, timing duration of the second timer based on the second RRC release time, and starting the second timer; and releasing, by the base station, an RRC connection between the base station and the UE when the second timer expires.

With reference to the second aspect, in a first possible implementation of the second aspect, the preset RRC release time determining parameter is a volume of to-be-sent uplink data of the UE and/or an estimated time of sending the to-be-sent uplink data.

With reference to the second aspect or the first possible implementation of the second aspect, in a second possible implementation of the second aspect, before the releasing, by the base station, an RRC connection between the base station and the UE when the second timer expires, the method further includes:

if the base station receives a BSR reported by the UE, adjusting, by the base station, the timing duration of the second timer based on the BSR; and generating, by the base station, a first adjustment instruction and a second adjustment instruction based on a result of adjusting the timing duration of the second timer, returning the first adjustment instruction to the UE, and notifying a mobility management entity MME of the second adjustment instruction.

With reference to the second aspect or the first possible implementation of the second aspect, in a third possible implementation of the second aspect, after the base station feeds back the response message to the UE, the method further includes:

after receiving an acknowledgement message sent by the UE for the response message, sending, by the base station, S1 connection resume indication information to an MME, where the S1 connection resume indication information carries the timing duration of the second timer;

receiving, by the base station, S1 connection resume confirmation indication information sent by the MME; and determining, by the base station based on the S1 connection resume confirmation indication information, that an S1 connection between the base station and the MME is resumed.

According to a third aspect, an RRC connection release method is provided, and the method includes:

receiving, by a mobility management entity MME, S1 connection resume indication information sent by a base station, where the S1 connection resume indication information carries timing duration of a second timer, the timing duration of the second timer is set by the base station based on a first message sent by UE, and the first message carries a preset RRC release time determining parameter or a first RRC release time;

setting, by the MME, timing duration of a third timer based on the timing duration of the second timer, and starting the third timer; and determining, by the MME when the third timer expires, that the UE releases an RRC connection.

With reference to the third aspect, in a first possible implementation of the third aspect, after the receiving, by an MME, S1 connection resume indication information sent by a base station, the method further includes:

determining, by the MME based on the S1 connection resume indication message, to resume an S1 connection between the MME and the base station; and sending, by the MME, S1 connection resume confirmation indication information to the base station.

With reference to the third aspect, in a second possible implementation of the third aspect, before the determining, by the MME when the third timer expires, that the UE releases an RRC connection, the method further includes:

if the MME receives a second adjustment instruction sent by the base station, adjusting, by the MME, the timing duration of the third timer based on the second adjustment instruction.

According to a fourth aspect, an RRC connection release method is provided, and the method includes:

sending, by UE, a first message to a base station, where the first message carries indication information that indicates whether the UE needs to receive downlink data;

when the UE does not need to receive the downlink data, sending, by the UE, to-be-sent uplink data to the base station, adding an endmarker indication packet to a last uplink data packet, and after sending the last uplink data packet, releasing, by the UE, an RRC connection; and/or when the UE needs to receive the downlink data, receiving, by the UE, the downlink data after sending the to-be-sent uplink data, and after obtaining, by means of parsing, an endmarker indication packet included in a received downlink data packet, releasing an RRC connection.

With reference to the fourth aspect, in a first possible implementation of the fourth aspect, the UE adds the endmarker indication packet to a Packet Data Convergence Protocol PDCP header of the last uplink data packet of the to-be-sent uplink data.

According to a fifth aspect, an RRC connection release method is provided, and the method includes:

receiving, by a base station, a first message sent by UE, where the first message carries indication information that indicates whether the UE needs to receive downlink data;

when determining that the indication information indicates that the UE does not need to receive the downlink data, receiving, by the base station, to-be-sent uplink data sent by the UE, and after obtaining, by means of parsing, an endmarker indication packet included in a received uplink data packet, releasing an RRC connection between the base station and the UE; and/or when determining that the indication information indicates that the UE needs to receive the downlink data, after receiving the to-be-sent uplink data sent by the UE, continuing to send, by the base station, the downlink data to the UE; when sending a last downlink data packet, adding an endmarker indication packet to the last downlink data packet; and after sending, to the UE, the last downlink data packet that carries the endmarker indication packet, releasing, by the base station, an RRC connection between the base station and the UE.

With reference to the fifth aspect, in a first possible implementation of the fifth aspect, the method further includes:

when the base station determines that the indication information indicates that the UE does not need to receive the downlink data, after obtaining, by means of parsing, the endmarker indication packet from the to-be-sent uplink data sent by the UE, adding, by the base station, the endmarker indication packet to a GPRS tunneling protocol GTP header of a last uplink data packet of the to-be-sent uplink data, and sending the last uplink data packet to a serving gateway S-GW; and/or the adding, by the base station, an endmarker indication packet to the last downlink data packet when the base station determines that the indication information indicates that the UE does needs to receive downlink data includes:

after obtaining, by means of parsing, the endmarker indication packet from the downlink data sent by the S-GW, determining, by the base station, that the last downlink data packet is received; and adding, by the base station, the endmarker indication packet to a PDCP header of the last downlink data packet.

According to a sixth aspect, an RRC connection release method is provided, and the method includes:

reporting, by UE, an application message to a network side device, where the application message carries an application layer protocol type of the UE; and after exchanging, with the network side device, all data packets required for the application layer protocol type, releasing, by the UE, an RRC connection.

With reference to the sixth aspect, in a first possible implementation of the sixth aspect, the application layer protocol type is a Transmission Control Protocol/Hypertext Transfer Protocol TCP/HTTP or a user datagram protocol UDP.

According to a seventh aspect, an RRC connection release method is provided, and the method includes:

receiving, by a network side device, an application message reported by UE, where the application message carries an application layer protocol type of the UE;

determining, by the network side device based on the application layer protocol type, a quantity of to-be-transmitted data packets that is corresponding to the application layer protocol type;

receiving and processing, by the network side device, a data packet transmitted by the UE for the application layer protocol type, and recording a quantity of processed data packets; and when the network side device determines that the recorded quantity of data packets reaches the quantity of to-be-transmitted data packets that is corresponding to the application layer protocol type, releasing, by the network side device, an RRC connection between the network side device and the UE.

According to an eighth aspect, an RRC connection release apparatus is provided, and the apparatus includes a first sending unit, a first processing unit, a first receiving unit, and a first judging unit, where the first sending unit is configured to send a first message to abase station, where the first message carries a preset RRC release time determining parameter or a first RRC release time;

the first processing unit is configured to: when the first message carries the first RRC release time, set timing duration of a first timer based on the first RRC release time, and start the first timer; or the first receiving unit is configured to receive a response message fed back by the base station for the first message, where the response message carries a second RRC release time determined by the base station based on the preset RRC release time determining parameter, and the first processing unit is configured to: when the first message carries the preset RRC release time determining parameter, set timing duration of the first timer based on the second RRC release time, and start the first timer; and the first judging unit is configured to release an RRC connection when the first timer expires.

With reference to the eighth aspect, in a first possible implementation of the eighth aspect, the preset RRC release time determining parameter is a volume of to-be-sent uplink data of the apparatus and/or an estimated time of sending the to-be-sent uplink data.

With reference to the eighth aspect or the first possible implementation of the eighth aspect, in a second possible implementation of the eighth aspect, the first sending unit is further configured to report a BSR to the base station, where the BSR is used to instruct the base station to adjust timing duration of a second timer, and the timing duration of the second timer is set by the base station based on the first message sent by the UE;

the first receiving unit is further configured to receive a first adjustment instruction returned by the base station; and the first processing unit is further configured to: when the first adjustment instruction returned by the base station is received, adjust the timing duration of the first timer based on the first adjustment instruction.

According to a ninth aspect, an RRC connection release apparatus is provided, and the apparatus includes a second receiving unit, a second processing unit, a second sending unit, and a second judging unit, where the second receiving unit is configured to receive a first message sent by UE, where the first message carries a preset RRC release time determining parameter or a first RRC release time;

the second processing unit is configured to: when determining that the first message carries the first RRC release time, set timing duration of a second timer based on the first RRC release time, and start the second timer; or the second processing unit is configured to: when determining that the first message carries the preset RRC release time determining parameter, determine a second RRC release time based on the preset RRC release time determining parameter, set timing duration of the second timer based on the second RRC release time, and start the second timer, and the second sending unit is configured to feed back a response message to the UE for the first message, where the response message carries the second RRC release time; and the second judging unit is configured to release, by the base station, an RRC connection between the RRC connection release apparatus and the UE when the second timer expires.

With reference to the ninth aspect, in a first possible implementation of the ninth aspect, the preset RRC release time determining parameter is a volume of to-be-sent uplink data of the UE and/or an estimated time of sending the to-be-sent uplink data.

With reference to the ninth aspect or the first possible implementation of the ninth aspect, in a second possible implementation of the ninth aspect, the second receiving unit is further configured to receive a BSR reported by the UE;

the second processing unit is further configured to: when the BSR reported by the UE is received, adjust the timing duration of the second timer, and generate a first adjustment instruction and a second adjustment instruction based on a result of adjusting the timing duration of the second timer; and the second sending unit is further configured to: return the first adjustment instruction to the UE, and notify an MME of the second adjustment instruction.

With reference to the ninth aspect or the first possible implementation of the ninth aspect, in a third possible implementation of the ninth aspect, the second receiving unit is further configured to receive an acknowledgement message sent by the UE for the response message;

the second sending unit is further configured to: after the second receiving unit receives the acknowledgement message sent by the UE for the response message, send S1 connection resume indication information to an MME, where the S1 connection resume indication information carries the timing duration of the second timer;

the second receiving unit is further configured to receive S1 connection resume confirmation indication information sent by the MME; and the second processing unit is further configured to determine, based on the S1 connection resume confirmation indication information, that an S1 connection between the base station and the MME is resumed.

According to a tenth aspect, an RRC connection release apparatus is provided, and the apparatus includes:

a third receiving unit, configured to receive S1 connection resume indication information sent by a base station, where the S1 connection resume indication information carries timing duration of a second timer, the timing duration of the second timer is set by the base station based on a first message sent by UE, and the first message carries a preset RRC release time determining parameter or a first RRC release time;

a third processing unit, configured to: set timing duration of a third timer based on the timing duration of the second timer, and start the third timer; and a third judging unit, configured to: when the third timer expires, determine that the UE releases an RRC connection.

With reference to the tenth aspect, in a first possible implementation of the tenth aspect, the third processing unit is configured to determine, based on the S1 connection resume indication information, to resume an S1 connection between the RRC connection release apparatus and the base station; and a third sending unit is configured to send S1 connection resume confirmation indication information to the base station.

With reference to the tenth aspect, in a second possible implementation of the tenth aspect, the third receiving unit is further configured to receive a second adjustment instruction sent by the base station; and the third processing unit is further configured to: when the third receiving unit receives the second adjustment instruction sent by the base station, adjust the timing duration of the third timer based on the second adjustment instruction.

According to an eleventh aspect, an RRC connection release apparatus is provided, and the apparatus includes a fourth sending unit, a fourth processing unit, and a fourth receiving unit, where the fourth sending unit is configured to send a first message to a base station, where the first message carries indication information that indicates whether the UE needs to receive downlink data; and the fourth sending unit is configured to: when the fourth processing unit determines that the UE does not need to receive the downlink data, send to-be-sent uplink data to the base station, and the fourth processing unit is configured to: add an endmarker indication packet to a last uplink data packet, and after the fourth sending unit sends the last uplink data packet, release an RRC connection; and/or the fourth sending unit is configured to: when the fourth processing unit determines that the UE needs to receive the downlink data, send to-be-sent uplink data to the base station, the fourth receiving unit is configured to: when the fourth processing unit determines that the to-be-sent uplink data is sent, receive the downlink data, and the fourth processing unit is configured to: after obtaining, by means of parsing, an endmarker indication packet included in a downlink data packet received by the fourth receiving unit, release an RRC connection.

With reference to the eleventh aspect, in a first possible implementation of the eleventh aspect, the fourth processing unit is further configured to add the endmarker indication packet to a PDCP header of the last uplink data packet of the to-be-sent uplink data.

According to a twelfth aspect, an RRC connection release apparatus is provided, and the apparatus includes a fifth receiving unit, a fifth processing unit, and a fifth sending unit, where the fifth receiving unit is configured to receive a first message sent by UE, where the first message carries indication information that indicates whether the UE needs to receive downlink data; and the fifth receiving unit is configured to: when the fifth processing unit determines that the indication information indicates that the UE does not need to receive the downlink data, receive to-be-sent uplink data sent by the UE, and the fifth processing unit is configured to: after obtaining, by means of parsing, an endmarker indication packet included in an uplink data packet received by the fifth receiving unit, release an RRC connection between the RRC connection release apparatus and the UE; and/or the fifth receiving unit is configured to: when the fifth processing unit determines that the indication information indicates that the UE needs to receive the downlink data, receive to-be-sent uplink data sent by the UE, the fifth sending unit is configured to: after the fifth receiving unit receives the to-be-sent uplink data sent by the UE, continue to send the downlink data to the UE, and the fifth processing unit is configured to: when the fifth sending unit sends a last downlink data packet, add an endmarker indication packet to the last downlink data packet, and after the last downlink data packet that carries the endmarker indication packet is sent to the UE, release an RRC connection between the RRC connection release apparatus and the UE.

With reference to the twelfth aspect, in a first possible implementation of the twelfth aspect, the fifth processing unit is further configured to: when determining that the indication information indicates that the UE does not need to receive the downlink data, after obtaining, by means of parsing, the endmarker indication packet from the to-be-sent uplink data sent by the UE, add the endmarker indication packet to a GPRS tunneling protocol GTP header of a last uplink data packet of the to-be-sent uplink data, and send the last uplink data packet to a serving gateway S-GW; and/or when determining that the indication information indicates that the UE needs to receive the downlink data, and adding the endmarker indication packet to the last downlink data packet, the fifth processing unit is further configured to:

after obtaining, by means of parsing, the endmarker indication packet from the downlink data sent by the S-GW, determine that the last downlink data packet is received; and add the endmarker indication packet to a PDCP header of the last downlink data packet.

According to a thirteenth aspect, an RRC connection release apparatus is provided, and the apparatus includes:

a sixth sending unit, configured to report an application message to a network side device, where the application message carries an application layer protocol type of the UE; and a sixth judging unit, configured to: after all data packets required for the application layer protocol type are exchanged with the network side device, release an RRC connection.

With reference to the thirteenth aspect, in a first possible implementation of the thirteenth aspect, the application layer protocol type is a Transmission Control Protocol/Hypertext Transfer Protocol TCP/HTTP or a user datagram protocol UDP.

According to a fourteenth aspect, an RRC connection release apparatus is provided, and the apparatus includes:

a seventh receiving unit, configured to receive an application message reported by UE, where the application message carries an application layer protocol type of the UE;

a determining unit, configured to determine, based on the application layer protocol type, a quantity of to-be-transmitted data packets that is corresponding to the application layer protocol type;

a counting unit, configured to: receive and process a data packet transmitted by the UE for the application layer protocol type, and record a quantity of processed data packets; and a seventh judging unit, configured to: when determining that the recorded quantity of data packets reaches the quantity of to-be-transmitted data packets that is corresponding to the application layer protocol type, release an RRC connection between the RRC connection release apparatus and the UE.

According to a fifteenth aspect, an RRC connection release device is provided, and the device includes a first transceiver and a first processor, where the first transceiver is configured to send a first message to a base station, where the first message carries a preset RRC release time determining parameter or a first RRC release time;

the first processor is configured to: when the first message carries the first RRC release time, set timing duration of a first timer based on the first RRC release time, and start the first timer; or the first transceiver is configured to: when the first message carries the preset RRC release time determining parameter, receive a response message fed back by the base station for the first message, where the response message carries a second RRC release time determined by the base station based on the preset RRC release time determining parameter, and the first processor is configured to: set timing duration of the first timer based on the second RRC release time, and start the first timer; and the first processor is further configured to release an RRC connection when the first timer expires.

With reference to the fifteenth aspect, in a first possible implementation of the fifteenth aspect, the preset RRC release time determining parameter is a volume of to-be-sent uplink data of the UE and/or an estimated time of sending the to-be-sent uplink data.

With reference to the fifteenth aspect or the first possible implementation of the fifteenth aspect, in a second possible implementation of the fifteenth aspect, the first transceiver is further configured to: report a BSR to the base station, where the BSR is used to instruct the base station to adjust timing duration of a second timer, and the timing duration of the second timer is set by the base station based on the first message sent by the UE; and receive a first adjustment instruction returned by the base station; and the first processor is further configured to: when the first adjustment instruction returned by the base station is received, adjust the timing duration of the first timer based on the first adjustment instruction.

According to a sixteenth aspect, an RRC connection release device is provided, and the device includes a second transceiver and a second processor, where the second transceiver is configured to receive a first message sent by UE, where the first message carries a preset RRC release time determining parameter or a first RRC release time;

the second processor is configured to: when determining that the first message carries the first RRC release time, set timing duration of a second timer based on the first RRC release time, and start the second timer; or the second processor is configured to: when determining that the first message carries the preset RRC release time determining parameter, determine a second RRC release time based on the preset RRC release time determining parameter, set timing duration of the second timer based on the second RRC release time, and start the second timer, and the second transceiver is configured to feedback a response message to the UE for the first message, where the response message carries the second RRC release time; and the second processor is further configured to release an RRC connection between the RRC connection release device and the UE when the second timer expires.

With reference to the sixteenth aspect, in a first possible implementation of the sixteenth aspect, the second transceiver is further configured to receive a BSR reported by the UE;

the second processor is further configured to: when the second transceiver receives the BSR reported by the UE, adjust the timing duration of the second timer, and generate a first adjustment instruction and a second adjustment instruction based on a result of adjusting the timing duration of the second timer; and the second transceiver is further configured to: return the first adjustment instruction to the UE, and notify an MME of the second adjustment instruction.

With reference to the sixteenth aspect, in a second possible implementation of the sixteenth aspect, the second transceiver is further configured to: receive an acknowledgement message sent by the UE for the response message; after receiving the acknowledgement message sent by the UE for the response message, send S1 connection resume indication information to an MME, where the S1 connection resume indication information carries the timing duration of the second timer; and receive S1 connection resume confirmation indication information sent by the MME; and the second processor is configured to determine, based on the S1 connection resume confirmation indication information, that an S1 connection between the base station and the MME is resumed.

According to a seventeenth aspect, an RRC connection release device is provided, and the device includes:

a third transceiver, configured to receive S1 connection resume indication information sent by a base station, where the S1 connection resume indication information carries timing duration of a second timer, the timing duration of the second timer is set by the base station based on a first message sent by UE, and the first message carries a preset RRC release time determining parameter or a first RRC release time; and a third processor, configured to: set timing duration of a third timer based on the timing duration of the second timer, start the third timer, and when the third timer expires, determine that the UE releases an RRC connection.

With reference to the seventeenth aspect, in a first possible implementation of the seventeenth aspect, the third processor is further configured to determine, based on the S1 connection resume indication information, to resume an S1 connection between RRC connection release device and the base station; and the third transceiver is further configured to send S1 connection resume confirmation indication information to the base station.

With reference to the seventeenth aspect, in a second possible implementation of the seventeenth aspect, the third transceiver is configured to receive a second adjustment instruction sent by the base station; and the third processor is configured to adjust the timing duration of the third timer based on the second adjustment instruction.

According to an eighteenth aspect, an RRC connection release device is provided, and the device includes a fourth transceiver and a fourth processor, where the fourth transceiver is configured to send a first message to a base station, where the first message carries indication information that indicates whether the UE needs to receive downlink data; and the fourth transceiver is configured to: when the RRC connection release device does not need to receive the downlink data, send to-be-sent uplink data to the base station, and the fourth processor is configured to: add an endmarker indication packet to a last uplink data packet, and after the fourth transceiver sends the last uplink data packet, release an RRC connection; and/or the fourth transceiver is configured to: when the fourth processor determines that the UE needs to receive the downlink data, receive the downlink data after sending the to-be-sent uplink data, and the fourth processor is configured to: after obtaining, by means of parsing, an endmarker indication packet included in a received downlink data packet, release an RRC connection.

With reference to the eighteenth aspect, in a first possible implementation of the eighteenth aspect, the fourth processor is further configured to add the endmarker indication packet to a PDCP header of the last uplink data packet of the to-be-sent uplink data.

According to a nineteenth aspect, a base station is provided, and the base station includes a fifth transceiver and a fifth processor, where the fifth transceiver is configured to receive a first message sent by UE, where the first message carries indication information that indicates whether the UE needs to receive downlink data; and the fifth transceiver is configured to: when the fifth processor determines that the indication information indicates that the UE does not need to receive the downlink data, receive to-be-sent uplink data sent by the UE, and the fifth processor is configured to: after obtaining, by means of parsing, an endmarker indication packet included in a received uplink data packet, release an RRC connection between the RRC connection release device and the UE; and/or the fifth transceiver is configured to: when the fifth processor determines that the indication information indicates that the UE needs to receive the downlink data, continue to send the downlink data to the UE after receiving the to-be-sent uplink data sent by the UE, and the fifth processor is configured to: when the fifth transceiver sends a last downlink data packet, add an endmarker indication packet to the last downlink data packet, and after the fifth transceiver sends, to the UE, the last downlink data packet that carries the endmarker indication packet, release an RRC connection between the RRC connection release device and the UE.

With reference to the nineteenth aspect, in a first possible implementation of the nineteenth aspect, the fifth processor is further configured to: when determining that the indication information indicates that the UE does not need to receive the downlink data, after obtaining, by means of parsing, the endmarker indication packet from the to-be-sent uplink data sent by the UE, add the endmarker indication packet to a GPRS tunneling protocol GTP header of a last uplink data packet of the to-be-sent uplink data, and send the last uplink data packet to a serving gateway S-GW; and/or when determining that the indication information indicates that the UE needs to receive the downlink data, and adding the endmarker indication packet to the last downlink data packet, the fifth processor is further configured to:

after obtaining, by means of parsing, the endmarker indication packet from the downlink data sent by the S-GW, determine that the last downlink data packet is received; and add the endmarker indication packet to a PDCP header of the last downlink data packet.

According to a twentieth aspect, an RRC connection release device is provided, and the device includes:

a sixth transceiver, configured to report an application message to a network side device, where the application message carries an application layer protocol type of the UE; and a sixth processor, configured to: after all data packets required for the application layer protocol type are exchanged with the network side device, release an RRC connection.

With reference to the twentieth aspect, in a first possible implementation of the twentieth aspect, the application layer protocol type is a Transmission Control Protocol/Hypertext Transfer Protocol TCP/HTTP or a user datagram protocol UDP.

According to a twenty-first aspect, an RRC connection release device is provided, and the device includes:

a seventh transceiver, configured to receive an application message reported by UE, where the application message carries an application layer protocol type of the UE; and a seventh processor, configured to determine, based on the application layer protocol type, a quantity of to-be-transmitted data packets that is corresponding to the application layer protocol type, where the seventh transceiver is configured to receive a data packet transmitted by the UE for the application layer protocol type; and the seventh processor is configured to: process the data packet transmitted by the UE for the application layer protocol type, record a quantity of processed data packets, and when determining that the recorded quantity of data packets reaches the quantity of to-be-transmitted data packets that is corresponding to the application layer protocol type, release an RRC connection between the RRC connection release device and the UE.

The base station receives a type of UE and/or a service type that are/is reported by each UE, and the base station receives data packets sent by at least two UEs. The base station cascades, based on the corresponding type of the UE and/or the corresponding service type that are/is reported by each UE, data packets of UEs that meet a preset condition.

The preset condition is dedicated for specific UE or a specific service. The base station transmits the cascaded data packets by using a common channel. The common channel may be established in a process of setting up a default bearer. The base station selects one of default bearer channels as the common channel. Alternatively, the base station requests to establish a new bearer channel after determining that UE meets the preset condition.

When cascading data packets of different UEs that meet the preset condition, the base station identifies the data packets of the different UEs based on IP addresses of the UEs or identifies the data packets of the different UEs based on GTP IPs and GTP TEIDs of the UEs.

Before the base station cascades the data packets of the different UEs that meet the preset condition, the base station receives a notification message that is sent by the MME and that carries an IP address of each UE.

Therefore, in the embodiments of the present disclosure, the base station cascades data packets of different UEs, and then transmits the cascaded data packets on a common channel. This reduces transmission load and improves transmission efficiency.

The eNB and UE reserve context information of the UE. The context information includes RRC configuration, bearer configuration, a security context, and the like, and preset paging-related information that includes a user identifier, TA lists, a default paging cycle of the UE, and a broadcast paging cycle in a system message sent by the eNB is added to the context information.

Based on the preset paging-related information recorded in the context information, the eNB can determine to-be-paged UE based on the user identifier, determine a paging area based on the TA lists, and select a shorter paging cycle from the default paging cycle of the UE and the broadcast paging cycle in the system message, to determine a time at which the eNB pages the UE on an air interface. When the paging time arrives, the eNB sends a paging message to the UE.

Based on the method provided in the embodiments of the present disclosure, the following problem is resolved: after UE that is in a static state releases an RRC connection, an S1 interface between the eNB and the MME may remain connected, and when the S1 remains connected, the MME no longer sends a paging message to the eNB, and consequently, the eNB cannot page the UE on an air interface.

Beneficial effects of the present disclosure are as follows: The UE sends the first message to the base station, where the first message carries the preset RRC release time determining parameter or the first RRC release time; if the UE adds the first RRC release time to the first message, the UE sets the timing duration of the first timer based on the first RRC release time, and starts the first timer; or if the UE adds the preset RRC release time determining parameter to the first message, the UE receives the response message fed back by the base station for the first message, where the response message carries the second RRC release time determined by the base station based on the preset RRC release time determining parameter, and the UE sets the timing duration of the first timer based on the second RRC release time, and starts the first timer; and the UE releases the RRC connection when the first timer expires. This greatly reduces signaling overheads in an RRC release process. The base station determines the timing duration of the second timer based on the first message, and sends, to the MME, the indication information that carries the timing duration of the second timer. The UE, the base station, and the MME respectively set the first timer, the second timer, and the third timer based on the RRC release time. When the UE determines that the first timer expires, the UE releases the RRC connection. When determining that the second timer expires, the base station releases the RRC connection between the base station and the UE. When determining that the third timer expires, the MME determines that the UE releases the RRC connection. This greatly reduces signaling overheads in an RRC release process.

The UE sends, to the base station, the first message that carries the indication information that indicates whether the UE needs to receive the downlink data. When the UE does not need to receive the downlink data, the UE sends the to-be-sent uplink data to the base station, and adds the endmarker indication packet to the last uplink data packet, and after sending the last uplink data packet, the UE releases the RRC connection. In addition, when determining, based on the indication information, that the UE does not need to receive the downlink data, after obtaining, by means of parsing, the endmarker indication packet included in the received uplink data packet, the base station releases the RRC connection between the base station and the UE. When the UE needs to receive the downlink data, the UE receives the downlink data after sending the to-be-sent uplink data, and after obtaining, by means of parsing, the endmarker indication packet included in the received downlink data packet, the UE releases the RRC connection. In addition, when determining, based on the indication information, that the UE needs to receive the downlink data, after sending, to the UE, the last downlink data packet that carries the endmarker indication packet, the base station releases the RRC connection between the base station and the UE. This greatly reduces signaling overheads in an RRC release process.

The UE reports, to the network side device, the application message that carries the application layer protocol type of the UE, and after exchanging, with the network side device, all the data packets required for application layer protocol type, the UE releases the RRC connection. The network side device determines, based on the application layer protocol type, the quantity of to-be-transmitted data packets that is corresponding to the application layer protocol type, and counts the data packets transmitted for the application layer protocol type, and when a counted number reaches the quantity of to-be-transmitted data packets that is corresponding to the application layer protocol type, the network side device releases the RRC connection between the network side device and the UE. This greatly reduces signaling overheads in an RRC release process.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide an RRC connection release method, apparatus, and device, to resolve a problem that network load is heavy because a large quantity of signaling is required in an RRC connection release process. The method and the apparatus are based on a same inventive concept. Because problem resolving principles of the method and the apparatus are similar, mutual reference may be made to implementation of the method and the apparatus. Details are not repeatedly described.

In the following, the preferred implementations of the present disclosure are described in detail with reference to the accompanying drawings.

Figure 1:
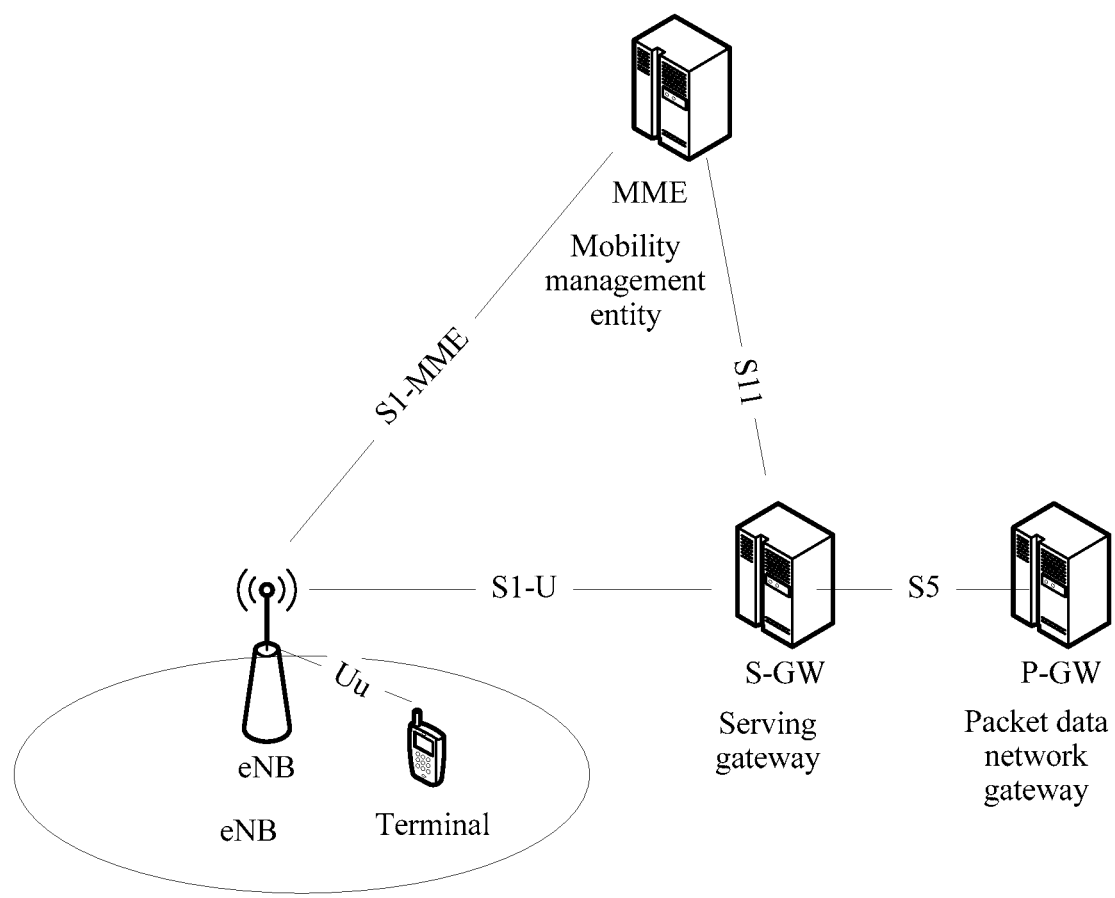
FIG. 1 is an architectural diagram of a network system according to an embodiment of the present disclosure.

The embodiments of the present disclosure are mainly applied to a scenario of a Long Term Evolution (Long term evolution, LTE) system. A system architecture of the system is shown in FIG. 1. The system mainly includes the following network elements: an eNB (Evolved Node B), a mobility management entity (MME), a serving gateway (S-GW), and a packet data network gateway (P-GW).

Figure 2:
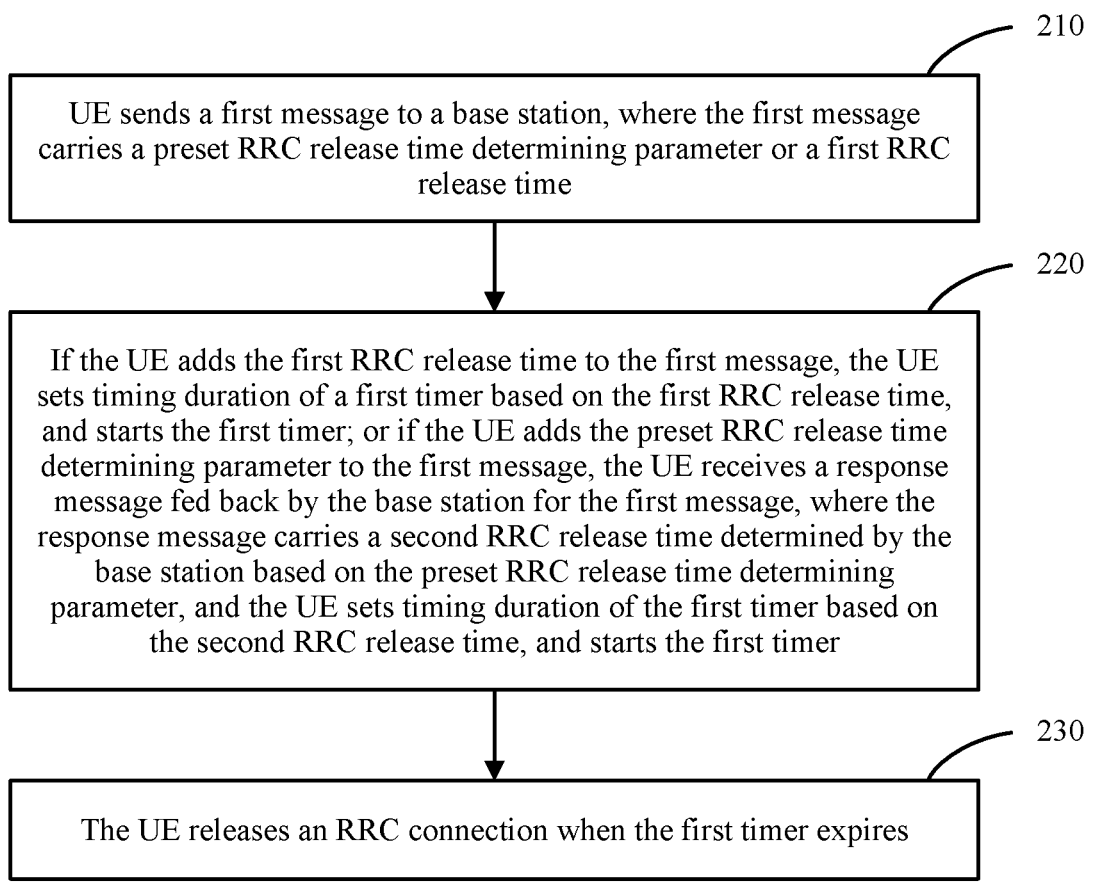
FIG. 2 is an overview flowchart A1 of RRC connection release according to an embodiment of the present disclosure.

Referring to FIG. 2, FIG. 2 is an overview flowchart A1 of RRC connection release according to an embodiment of the present disclosure.

The following describes a specific implementation process of this embodiment of the present disclosure with reference to the accompanying drawing.

Step 210: UE sends a first message to a base station.

The first message carries a preset RRC release time determining parameter or a first RRC release time.

The first RRC request message herein may be a new message, or may be carried in an existing RRC connection request message.

The preset RRC release time determining parameter is a volume of to-be-sent uplink data of the UE and/or an estimated time of sending the to-be-sent uplink data.

Step 220: If the UE adds a first RRC release time to the first message, the UE sets timing duration of a first timer based on the first RRC release time, and starts the first timer; or if the UE adds a preset RRC release time determining parameter to the first message, the UE receives a response message fed back by the base station for the first message, where the response message carries a second RRC release time determined by the base station based on the preset RRC release time determining parameter, and the UE sets timing duration of the first timer based on the second RRC release time, and starts the first timer.

The response message carries the second RRC release time determined by the base station based on the volume of the to-be-sent uplink data and/or the estimated time of sending the to-be-sent uplink data that are/is sent by the UE.

The response message herein may be a new message, or may be carried in an existing RRC setup message.

Step 230: The UE releases an RRC connection when the first timer expires.

In addition, before the first timer expires, the UE may further report a buffer status report (BSR) to the base station based on a requirement of the UE. The BSR is used to instruct the base station to adjust timing duration of a second timer, and the timing duration of the second timer is set by the base station based on the first message sent by the UE.

The UE receives a first adjustment instruction returned by the base station. For example, the instruction carries a time adjustment value ΔT or latest timing duration that is of the second timer and that is obtained after adjustment. The UE adjusts the timing duration of the first timer based on the first adjustment instruction.

For example, the BSR is reported when the UE transmits uplink data. The eNB correspondingly adjusts the timing duration of the second timer based on the BSR, for example, the timing duration of the second timer needs to be prolonged by 10s, and the eNB notifies the UE of the value by using the first adjustment instruction. The UE adjusts the timing duration of the first timer based on the instruction, that is, adds 10 s to the timing duration of the first timer.

Therefore, before the first timer expires, the UE resumes the RRC connection between the UE and the base station, and the UE that enters a connected state again sends uplink data. After determining that the first timer expires, the UE releases the RRC connection. This reduces signaling overheads in an RRC release process.

Figure 3:
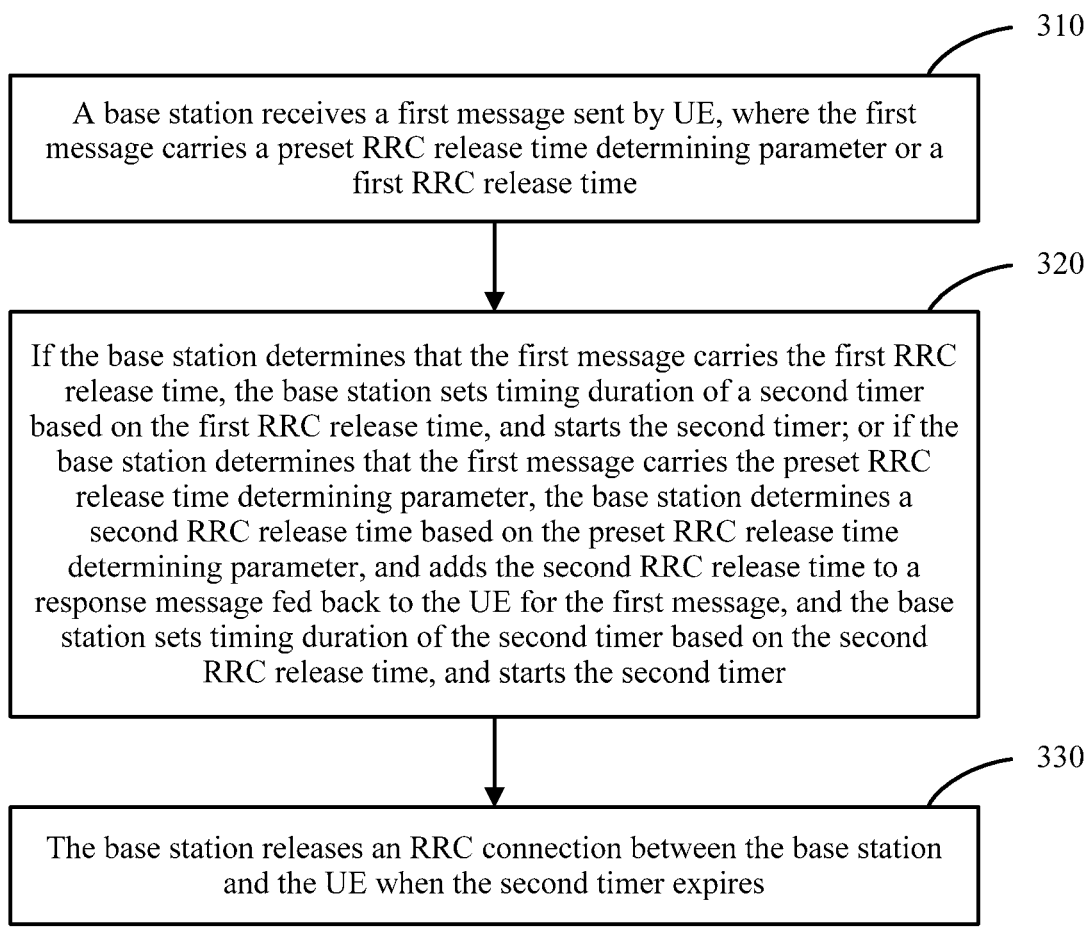
FIG. 3 is an overview flowchart A2 of RRC connection release according to an embodiment of the present disclosure.

Referring to FIG. 3, FIG. 3 is an overview flowchart A2 of RRC connection release according to an embodiment of the present disclosure.

Step 310: A base station receives a first message sent by UE.

The first message carries a preset RRC release time determining parameter or a first RRC release time.

The preset RRC release time determining parameter is a volume of to-be-sent uplink data of the UE and/or an estimated time of sending the to-be-sent uplink data.

The first RRC request message herein may be a new message, or may be carried in an existing RRC connection request message.

Step 320: If the base station determines that the first message carries a first RRC release time, the base station sets timing duration of a second timer based on the first RRC release time, and starts the second timer; or if the base station determines that the first message carries a preset RRC release time determining parameter, the base station determines a second RRC release time based on the preset RRC release time determining parameter, and adds the second RRC release time to a response message fed back to the UE for the first message, and the base station sets timing duration of the second timer based on the second RRC release time, and starts the second timer.

For example, when determining the second RRC release time, the base station may determine, based on the volume of the to-be-sent uplink data, a time required by the UE for sending the uplink data, and uses, as the second RRC release time, the determined time required for sending the uplink data.

For another example, when determining the second RRC release time, the base station directly determines, as the RRC release time, the estimated time of sending the to-be-sent uplink data, or uses, as the second RRC release time, a time obtained by increasing the estimated time by a preset delay.

The response message herein may be a new message, or may be carried in an existing RRC setup message.

In addition, after feeding back the response message to the UE, the base station receives an acknowledgement message sent by the UE for the response message. The acknowledgement message herein may be a new message, or may be carried in an existing RRC connection setup complete message.

After the base station receives the acknowledgement message sent by the UE for the response message, the base station sends S1 connection resume indication information to an MME. The S1 connection resume indication information carries the timing duration of the second timer.

Further, the base station receives S1 connection resume confirmation indication information sent by the MME, and determines, based on the S1 connection resume confirmation indication, that an S1 connection between the base station and the MME is resumed.

Step 330: The base station releases an RRC connection between the base station and the UE when the second timer expires.

In addition, before the second timer expires, if the base station receives a BSR reported by the UE, the base station adjusts the timing duration of the second timer based on the BSR, generates a first adjustment instruction and a second adjustment instruction, returns the first adjustment instruction to the UE, and notifies the MME of the second adjustment instruction.

Therefore, before the second timer expires, the base station resumes the RRC connection between the base station and the UE, and receives uplink data sent by the UE that enters a connected state again. After determining that the second timer expires, the base station releases the RRC connection between the base station and the UE. This reduces signaling overheads in an RRC release process.

Figure 4:
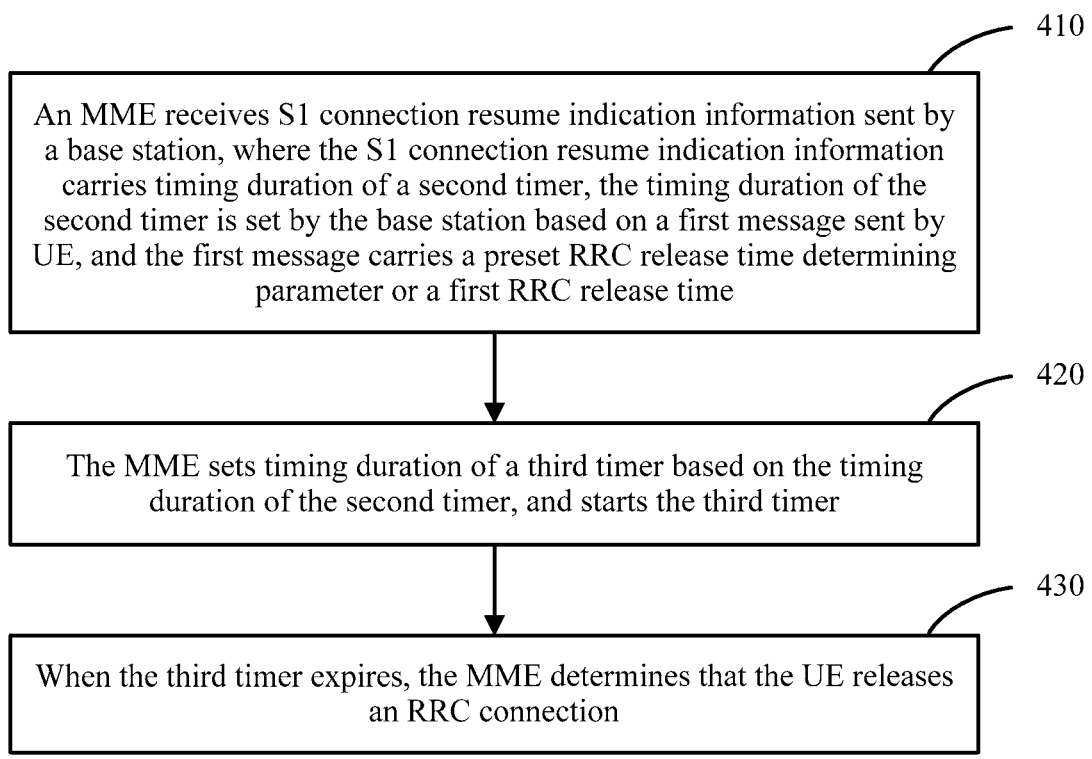
FIG. 4 is an overview flowchart A3 of RRC connection release according to an embodiment of the present disclosure.

Referring to FIG. 4, FIG. 4 is an overview flowchart A3 of RRC connection release according to an embodiment of the present disclosure.

Step 410: An MME receives S1 connection resume indication information sent by a base station.

The S1 connection resume indication information carries timing duration of a second timer, the timing duration of the second timer is set by the base station based on a first message sent by UE, and the first message carries a preset RRC release time determining parameter or a first RRC release time.

After the MME receives the S1 connection resume indication information sent by the base station, the MME resumes an S1 connection between the MME and the base station based on the S1 connection resume indication information, and then sends S1 connection resume confirmation indication information to the base station.

Step 420: The MME sets timing duration of a third timer based on timing duration of a second timer, and starts the third timer.

Step 430: When the third timer expires, the MME determines that UE releases an RRC connection.

Before the third timer expires, if the MME receives a second adjustment instruction sent by the base station, the MME adjusts the timing duration of the third timer based on the second adjustment instruction.

Figure 5:
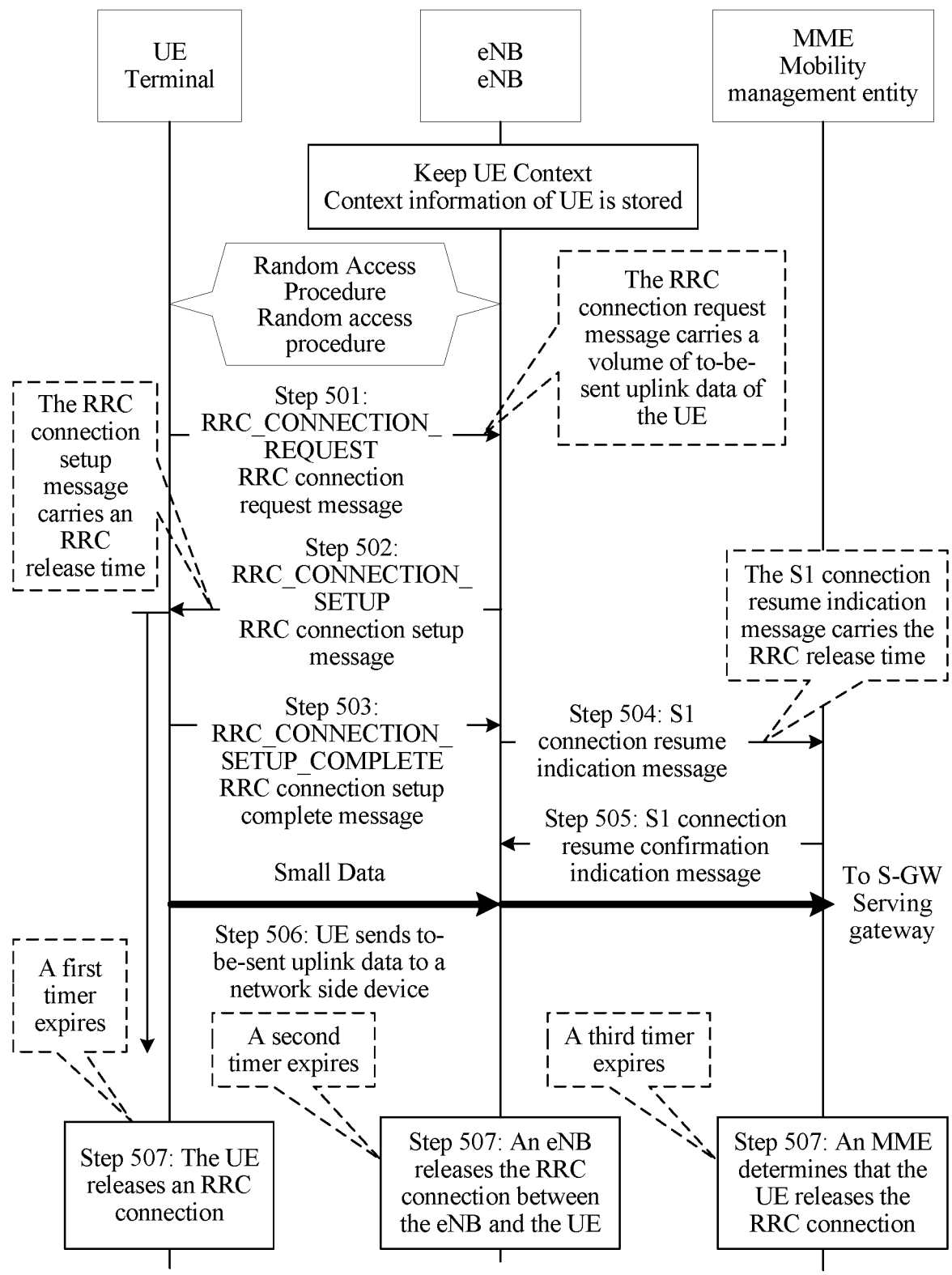
FIG. 5 is a specific flowchart A4 of RRC connection release according to an embodiment of the present disclosure.

Referring to FIG. 5, FIG. 5 is a specific flowchart A4 of RRC connection release according to an embodiment of the present disclosure.

After UE released an RRC connection last time, both the UE and an eNB reserve context information of the UE. When downlink data arrives (where downlink data transmission is triggered by a network) or uplink data arrives (where uplink data transmission is triggered by the UE), the UE needs to set up an RRC connection again. After random access between the UE and the eNB is completed, the following steps are performed.

Step 501: The UE sends an RRC connection request message to the eNB, where the request message carries a volume of to-be-sent uplink data of the UE.

Step 502: The eNB calculates an RRC release time based on the volume of the to-be-sent uplink data of the UE, adds the RRC release time to an RRC setup message, sends the RRC setup message to the UE, sets a second timer based on the RRC release time, and starts the second timer.

Step 503: The UE sets a first timer based on the RRC release time carried in the received RRC setup message, starts the first timer, and sends an RRC connection setup complete message to the eNB.

Step 504: After receiving the RRC connection setup complete message, the eNB sends S1 connection resume indication information to an MME, and adds the RRC release time to the S1 connection resume indication information.

Step 505: The MME returns an S1 connection resume confirmation indication message to the eNB, resumes an S1 connection between the MME and the eNB, sets a third timer based on the RRC release time, and starts the third timer.

Step 506: The UE sends the to-be-sent uplink data to a network side device.

Step 507: The UE releases an RRC connection when determining that the first timer expires; the eNB releases the RRC connection between the eNB and the UE when determining that the second timer expires; and the MME determines, when determining that the third timer expires, that the UE releases the RRC connection.

In addition, when the UE releases the RRC connection, the UE and the network side device need to reserve context information of the current connection of the UE.

Therefore, when the UE initiates resume of the RRC connection, the UE configures the RRC release time in an RRC connection setup process. The UE sets a timer based on the RRC release time, and releases the RRC connection after the timer expires. The network side device also sets a timer based on the RRC release time, and releases the RRC connection between the network side device and the UE after the timer expires. This reduces signaling overheads in an RRC connection release process.

Figure 6:
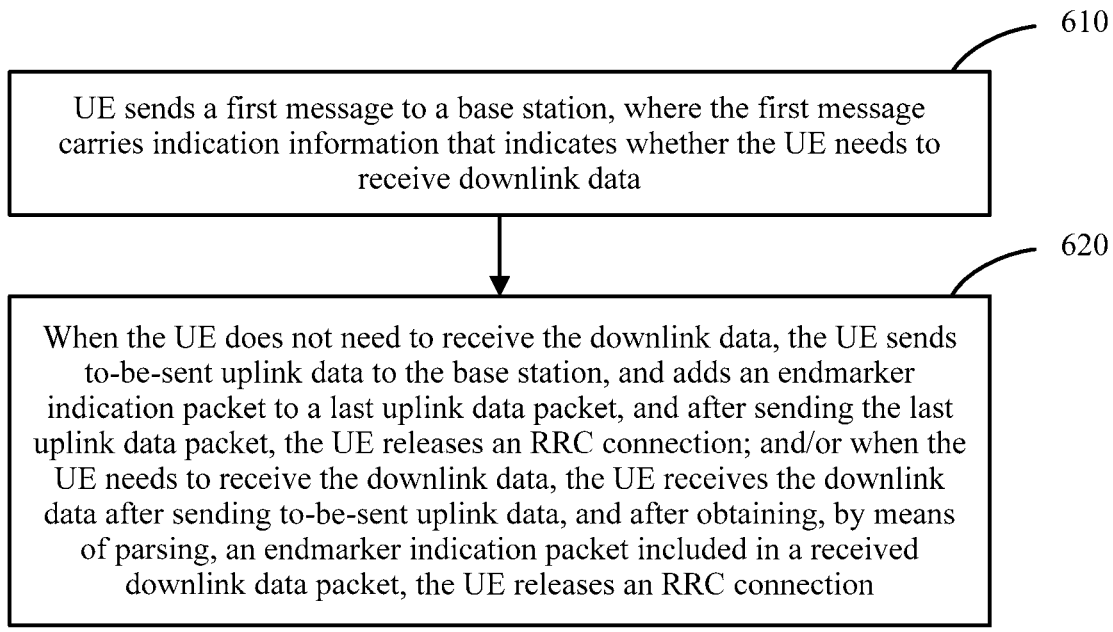
FIG. 6 is an overview flowchart B1 of RRC connection release according to an embodiment of the present disclosure.

Referring to FIG. 6, FIG. 6 is an overview flowchart B1 of RRC connection release according to an embodiment of the present disclosure.

Step 610: UE sends a first message to a base station.

The first message carries indication information that indicates whether the UE needs to receive downlink data. The first message herein may be a new message, or may be carried in an existing RRC connection request message.

Step 620: When the UE does not need to receive downlink data, the UE sends to-be-sent uplink data to the base station, and adds an endmarker indication packet to a last uplink data packet, and after sending the last uplink data packet, the UE releases an RRC connection; and/or when the UE needs to receive downlink data, the UE receives the downlink data after sending to-be-sent uplink data, and after obtaining, by means of parsing, an endmarker indication packet included in a received downlink data packet, the UE releases an RRC connection.

Specifically, two cases are included.

In a first case, the UE does not need to receive the downlink data, that is, the UE only sends the uplink data, and does not receive the downlink data.

In this case, after the UE resumes the RRC connection, the UE adds the endmarker indication packet to the last uplink data packet, that is, the UE adds the endmarker indication packet to a Packet Data Convergence Protocol (PDCP) header or a Medium Access Control (MAC) header of the last uplink data packet of the to-be-sent uplink data. After the uplink data is sent, the UE releases the RRC connection without waiting for the downlink data.

In a second case, the UE needs to receive the downlink data, that is, the UE not only sends the uplink data, but also receives the downlink data.

In this case, after resuming the RRC connection and sending the uplink data, the UE continues to receive the downlink data, and after obtaining, by means of parsing, the endmarker indication packet included in the downlink data packet, the UE releases the RRC connection.

Figure 7:
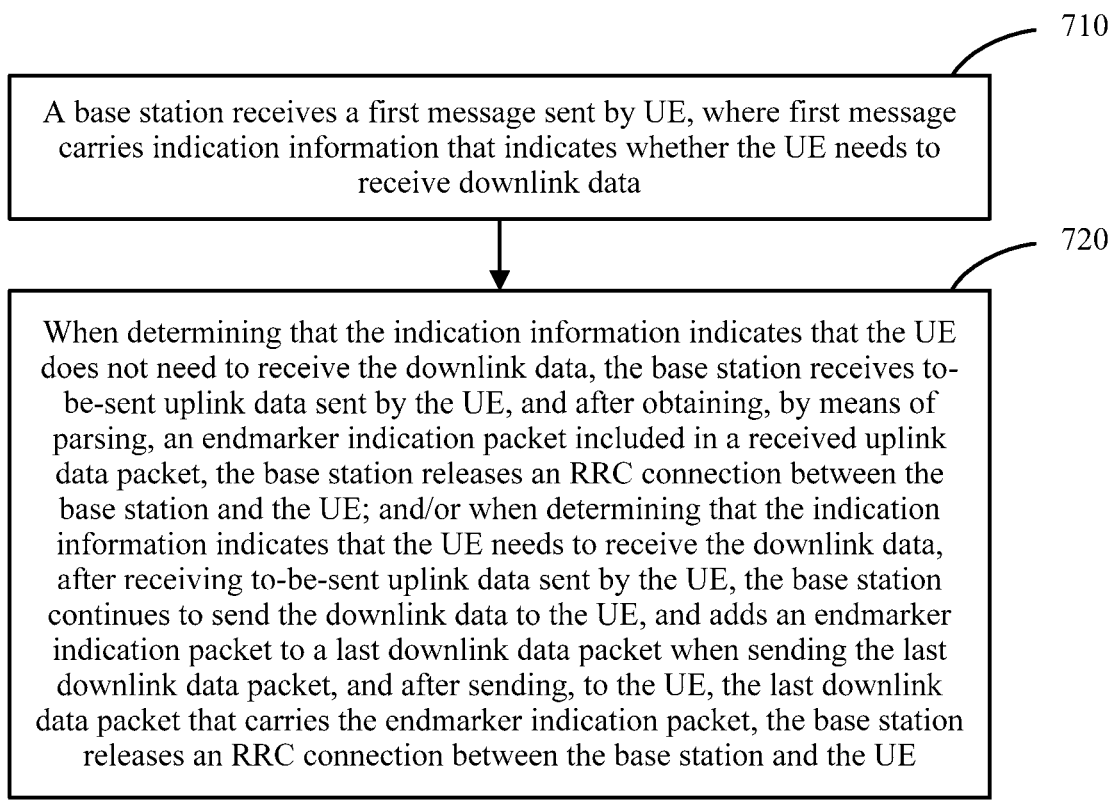
FIG. 7 is an overview flowchart B2 of RRC connection release according to an embodiment of the present disclosure.

Referring to FIG. 7, FIG. 7 is an overview flowchart B2 of RRC connection release according to an embodiment of the present disclosure.

Step 710: A base station receives a first message sent by UE.

The first message carries indication information that indicates whether the UE needs to receive downlink data. The first message herein may be a new message, or may be carried in an existing RRC connection request message.

Step 720: When determining that the indication information indicates that the UE does not need to receive downlink data, the base station receives to-be-sent uplink data sent by the UE, and after obtaining, by means of parsing, an endmarker indication packet included in a received uplink data packet, the base station releases an RRC connection between the base station and the UE; and/or when determining that the indication information indicates that the UE needs to receive downlink data, after receiving to-be-sent uplink data sent by the UE, the base station continues to send the downlink data to the UE, and adds an endmarker indication packet to a last downlink data packet when sending the last downlink data packet, and after sending, to the UE, the last downlink data packet that carries the endmarker indication packet, the base station releases an RRC connection between the base station and the UE.

Specifically, corresponding to a UE side, two cases are also included for an eNB side.

In a first case, the base station determines that the indication information indicates that the UE does not need to receive the downlink data.

After determining that RRC connection setup is completed, the base station receives the uplink data sent by the UE, and after obtaining, by means of parsing, the endmarker indication packet from the uplink data sent by the UE, the base station releases the RRC connection between the base station and the UE. The base station sends the received to-be-sent uplink data to an S-GW. The base station adds the endmarker indication packet to a GPRS tunneling protocol (GTP) header of a last uplink data packet of the to-be-sent uplink data, and sends the last uplink data packet to the S-GW.

In a second case, the base station determines that the indication information indicates that the UE needs to receive the downlink data.

After determining that RRC connection setup is completed, the base station receives the uplink data sent by the UE. After receiving the to-be-sent uplink data sent by the UE, the base station continues to receive the downlink data sent by the S-GW, and sends the downlink data to the UE. After obtaining, by means of parsing, the endmarker indication packet from the downlink data sent by the S-GW, the base station determines that the last downlink packet is received. The base station adds the endmarker indication packet to a PDCP header or a MAC header of the last downlink data packet, and after sending, to the UE, the last downlink data packet that carries the endmarker indication packet, the base station releases the RRC connection between the base station and the UE.

Figure 8:
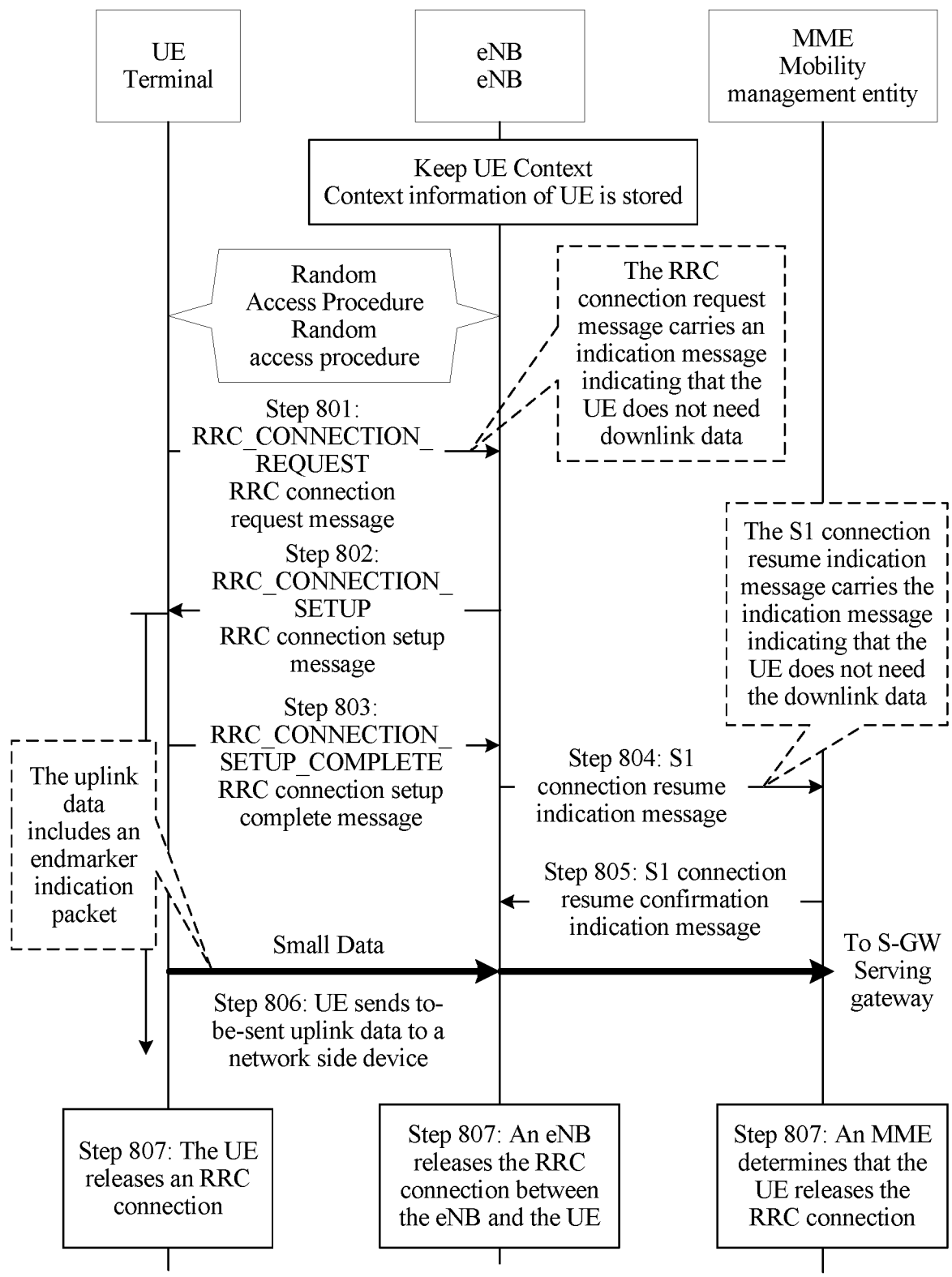
FIG. 8 is a specific flowchart B3 of RRC connection release according to an embodiment of the present disclosure.

Referring to FIG. 8, FIG. 8 is a specific flowchart B3 of RRC connection release according to an embodiment of the present disclosure.

After UE released an RRC connection last time, both the UE and an eNB reserve context information of the UE. When downlink data arrives (where downlink data transmission is triggered by a network) or uplink data arrives (where uplink data transmission is triggered by the UE), the UE needs to set up an RRC connection again. After random access between the UE and the eNB is completed, the following steps are performed.

Step 801: The UE sends an RRC connection request message to the eNB, where the request message carries indication information indicating that the UE does not need to receive downlink data.

Step 802: The eNB sends an RRC setup message to the UE.

Step 803: The UE sends an RRC connection setup complete message to the eNB.

Step 804: After receiving the RRC connection setup complete message, the eNB sends S1 connection resume indication information to an MME, and adds, to the S1 connection resume indication information, the indication information indicating that the UE does not need to receive the downlink data.

Step 805: The MME returns an S1 connection resume confirmation indication message to the eNB, to indicate that an S1 connection between the MME and the eNB is resumed.

Step 806: The UE sends to-be-sent uplink data to a network side device.

Step 807: The UE adds an endmarker indication packet to a last uplink data packet, and after sending the last uplink data packet, the UE releases an RRC connection; after obtaining, by means of parsing, the endmarker indication packet included in the received uplink data packet, the eNB releases the RRC connection between the eNB and the UE; and the MME determines that the UE releases the RRC connection.

The MME and an S-GW may be combined together, or the two network elements are connected by using an interface. When obtaining, by means of parsing, the endmarker indication packet included in the received uplink data packet, the S-GW determines that the UE releases the RRC connection, and notifies the MME of the message.

In addition, when the UE releases the RRC connection, the UE and the network side device need to reserve context information of the current connection of the UE.

Therefore, the UE adds the endmarker indication packet to the last uplink data packet of the uplink data, and after sending the last uplink data packet that carries the endmarker indication packet, the UE releases the RRC connection; and the network side device also releases the RRC connection between the network side device and the UE based on the endmarker indication packet obtained from the uplink data by means of parsing. This reduces signaling overheads in an RRC connection release process.

Figure 9:
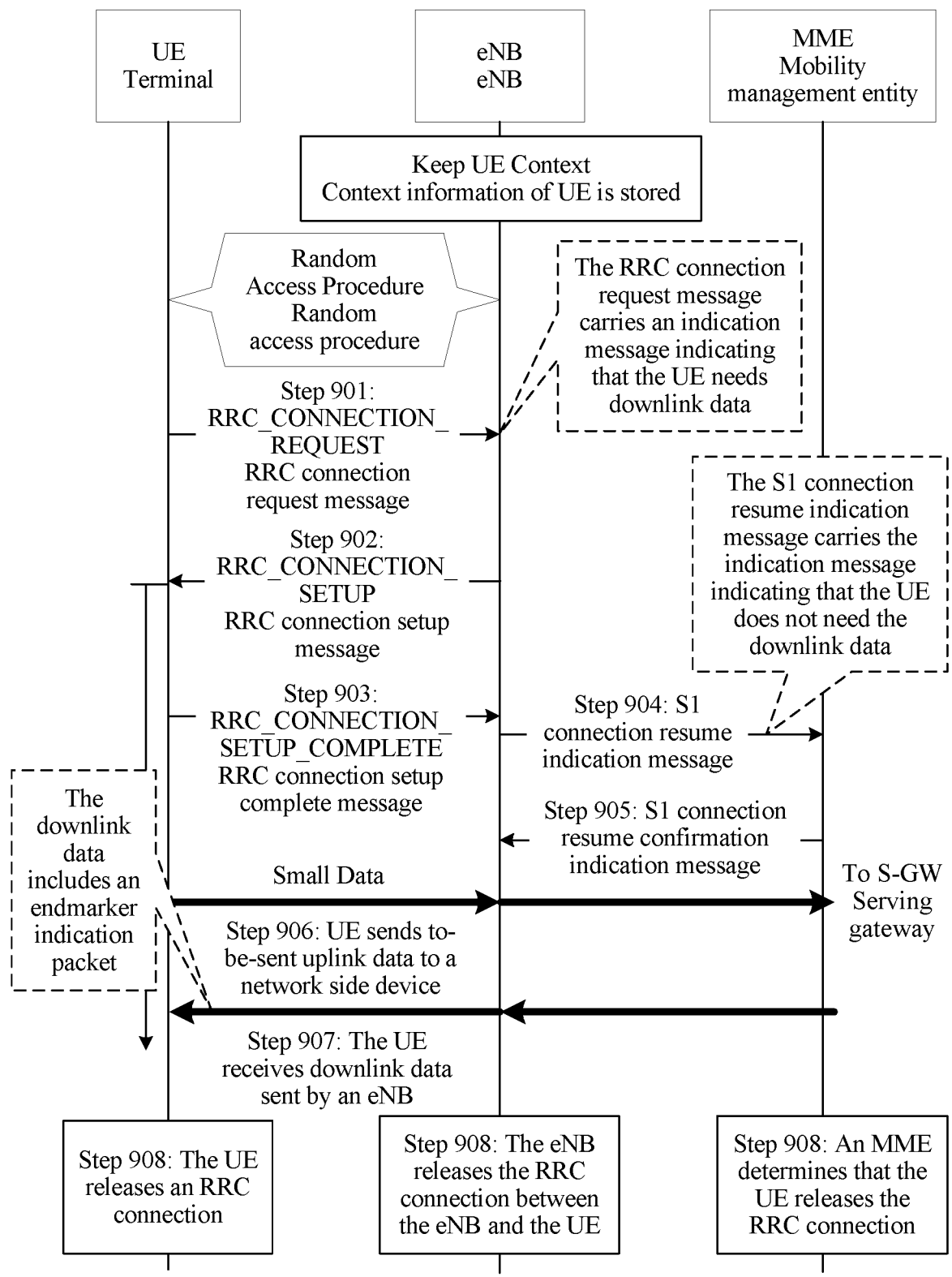
FIG. 9 is a specific flowchart B4 of RRC connection release according to an embodiment of the present disclosure.

Referring to FIG. 9, FIG. 9 is a specific flowchart B4 of RRC connection release according to an embodiment of the present disclosure.

After UE released an RRC connection last time, both the UE and an eNB reserve context information of the UE. When downlink data arrives (where downlink data transmission is triggered by a network) or uplink data arrives (where uplink data transmission is triggered by the UE), the UE needs to set up an RRC connection again. After random access between the UE and the eNB is completed, the following steps are performed.

Step 901: The UE sends an RRC connection request message to the eNB, where the request message carries indication information indicating that the UE needs to receive downlink data.

Step 902: The eNB sends an RRC setup message to the UE.

Step 903: The UE sends an RRC connection setup complete message to the eNB.

Step 904: After receiving the RRC connection setup complete message, the eNB sends an S1 connection resume indication message to an MME, and adds, to the S1 connection resume indication information, the indication information indicating that the UE needs to receive the downlink data.

Step 905: The MME returns an S1 connection resume confirmation indication message to the eNB, and resumes an S1 connection between the MME and the eNB.

Step 906: The UE sends to-be-sent uplink data to a network side device.

Step 907: The UE receives the downlink data sent by the eNB.

Step 908: After obtaining an endmarker indication packet from the downlink data by means of parsing, the UE releases an RRC connection; after adding the endmarker indication packet to a last downlink data packet and sending, to the UE, the last downlink data packet that carries the endmarker indication packet, the eNB releases the RRC connection between the eNB and the UE; and the MME determines that the UE releases the RRC connection.

The MME and an S-GW may be combined together, or the two network elements are connected by using an interface. After sending the last downlink data packet that carries the endmarker indication packet, the S-GW determines that the UE releases the RRC connection, and notifies the MME of the message.

In addition, when the UE releases the RRC connection, the UE and the network side device need to reserve context information of the current connection of the UE.

Therefore, after sending the uplink data, the UE receives the downlink data, and after obtaining the endmarker indication packet from the downlink data by means of parsing, the UE releases the RRC connection; and the eNB receives the uplink data sent by the UE, forwards the downlink data to the UE, and adds the endmarker indication packet to the last downlink data packet, and after sending, to the UE, the last downlink data packet that carries the endmarker indication packet, the eNB releases the RRC connection between the eNB and the UE. This reduces signaling overheads in an RRC connection release process.

Figure 10:
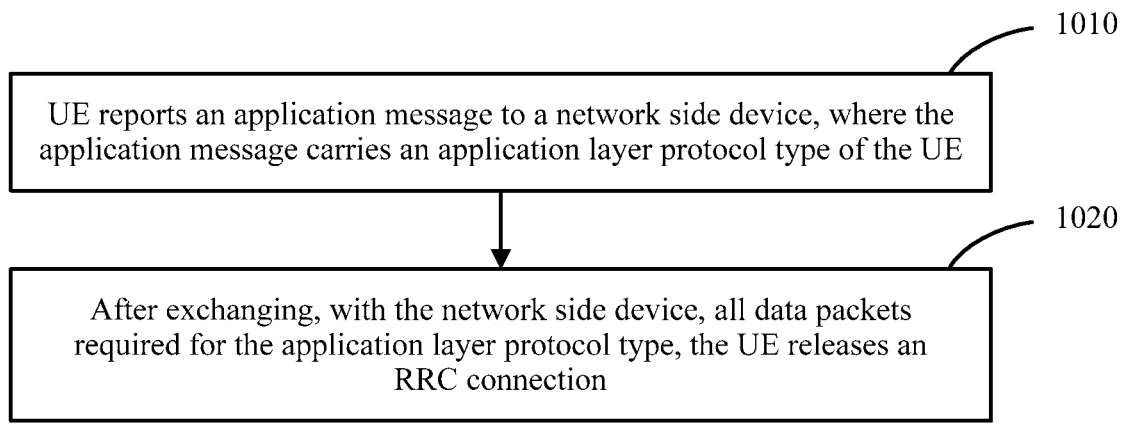
FIG. 10 is an overview flowchart C1 of RRC connection release according to an embodiment of the present disclosure.

Referring to FIG. 10, FIG. 10 is an overview flowchart C1 of RRC connection release according to an embodiment of the present disclosure.

Step 1010: UE reports an application message to a network side device, where the application message carries an application layer protocol type of the UE.

The application layer protocol type is a Hypertext Transfer Protocol (HTTP), a Transmission Control Protocol (TCP), a user datagram protocol (UDP), or the like.

Figure 11:
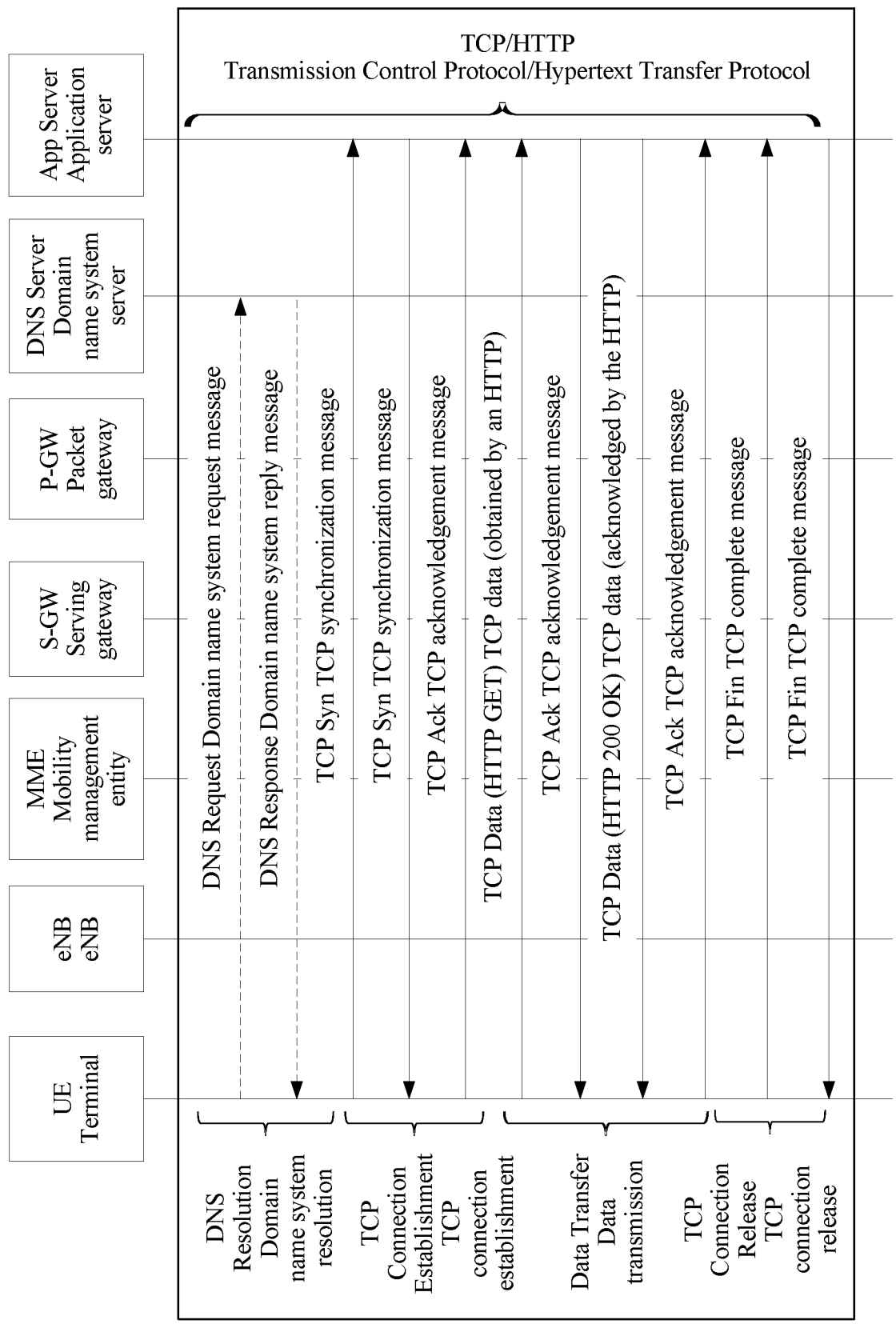
FIG. 11 shows a standard protocol process of an HTTP/TCP according to an embodiment of the present disclosure.

Referring to FIG. 11, FIG. 11 shows a standard protocol process of the HTTP/TCP. The HTTP is a protocol based on a request and response mode. Generally, a client initiates a request to establish a TCP connection to a specified port of a server. The server listens on the port for the request sent by the client. Once receiving the request, the server returns a response message to the client. The TCP is a reliable connection-oriented protocol. To ensure transmission reliability, a receive end sends a corresponding acknowledgement (ACK) for successfully received data. If a transmit end receives no acknowledgement within a proper round-trip latency, corresponding data is retransmitted. Connection-oriented means that a TCP connection needs to be established before a client and a server exchange a data packet. After the TCP connection is successfully established, data transmission may be started.

Figure 12:
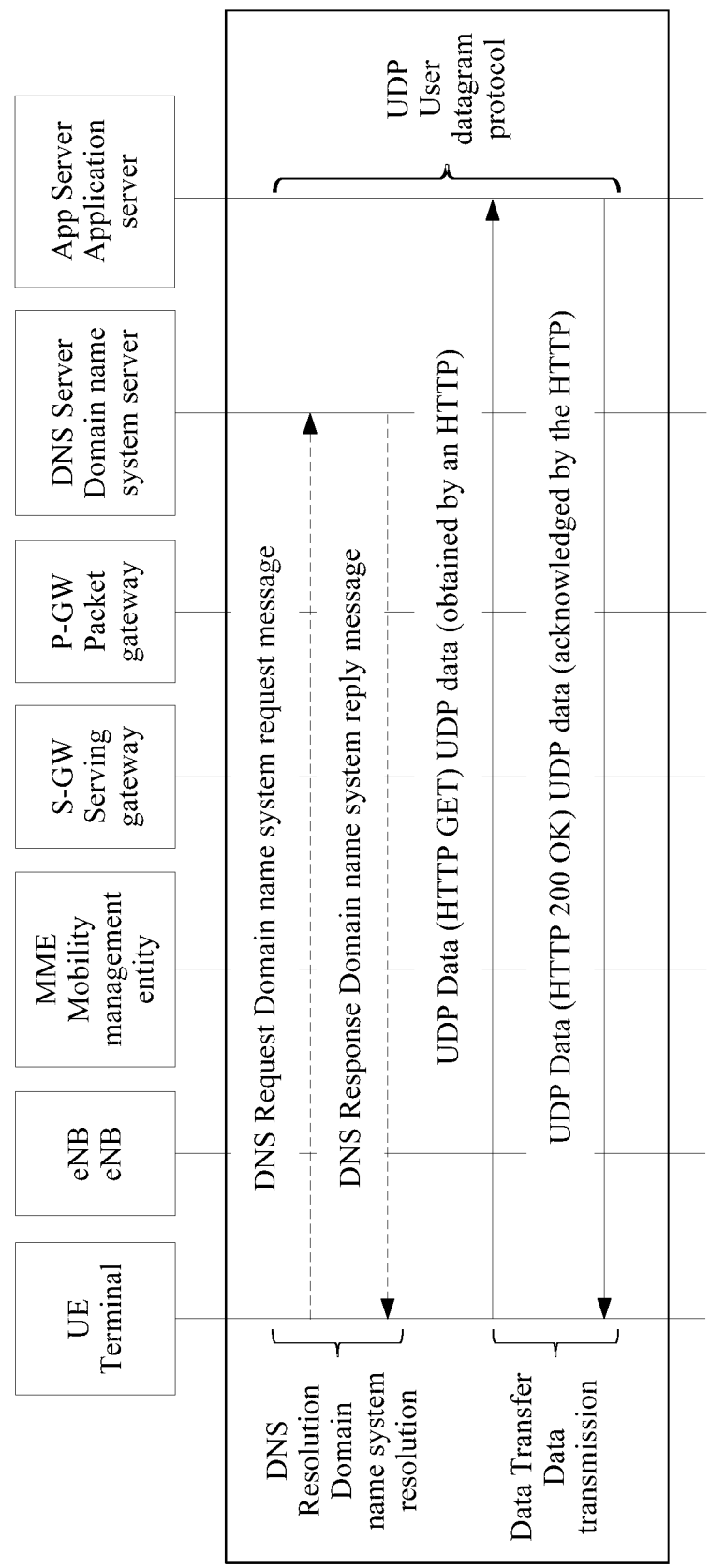
FIG. 12 shows a standard protocol process of a UDP according to an embodiment of the present disclosure.

Referring to FIG. 12, FIG. 12 shows a standard protocol process of the UDP. The UDP is a connectionless protocol, does not guarantee reliability of a transmitted data packet, and has advantages of little resource consumption and a rapid processing speed.

Step 1020: After exchanging, with the network side device, all data packets required for the application layer protocol type, the UE releases an RRC connection.

Therefore, after exchanging, based on a standard protocol process of the application layer protocol type, all the required data packets corresponding to the application layer protocol type, the UE releases the RRC connection.

As shown in FIG. 11, when the UE uses a TCP/HTTP application layer protocol, in order to complete data transmission, the UE first initiates a DNS request to a domain name system (Domain Name System, DNS) server, and the DNS server obtains an address based on a domain name by means of resolution, and returns the address to the UE, and then the UE establishes a TCP connection by using a three-way handshake protocol. After three-way handshake is completed, the UE starts to transmit data. After receiving TCP data, the server returns a TCP ACK, and an HTTP protocol layer generates an HTTP 200 OK, and sends the HTTP 200 OK to the UE. After receiving the HTTP 200 OK, the UE returns a TCP ACK to the server. After data transmission ends, the TCP connection needs to be released. After exchanging all data packets required for the TCP/HTTP, the UE releases the RRC connection.

It can be learned from FIG. 11 and FIG. 12 that a quantity of signaling required for completing data transmission varies with an application layer protocol used by the UE.

Figure 13:
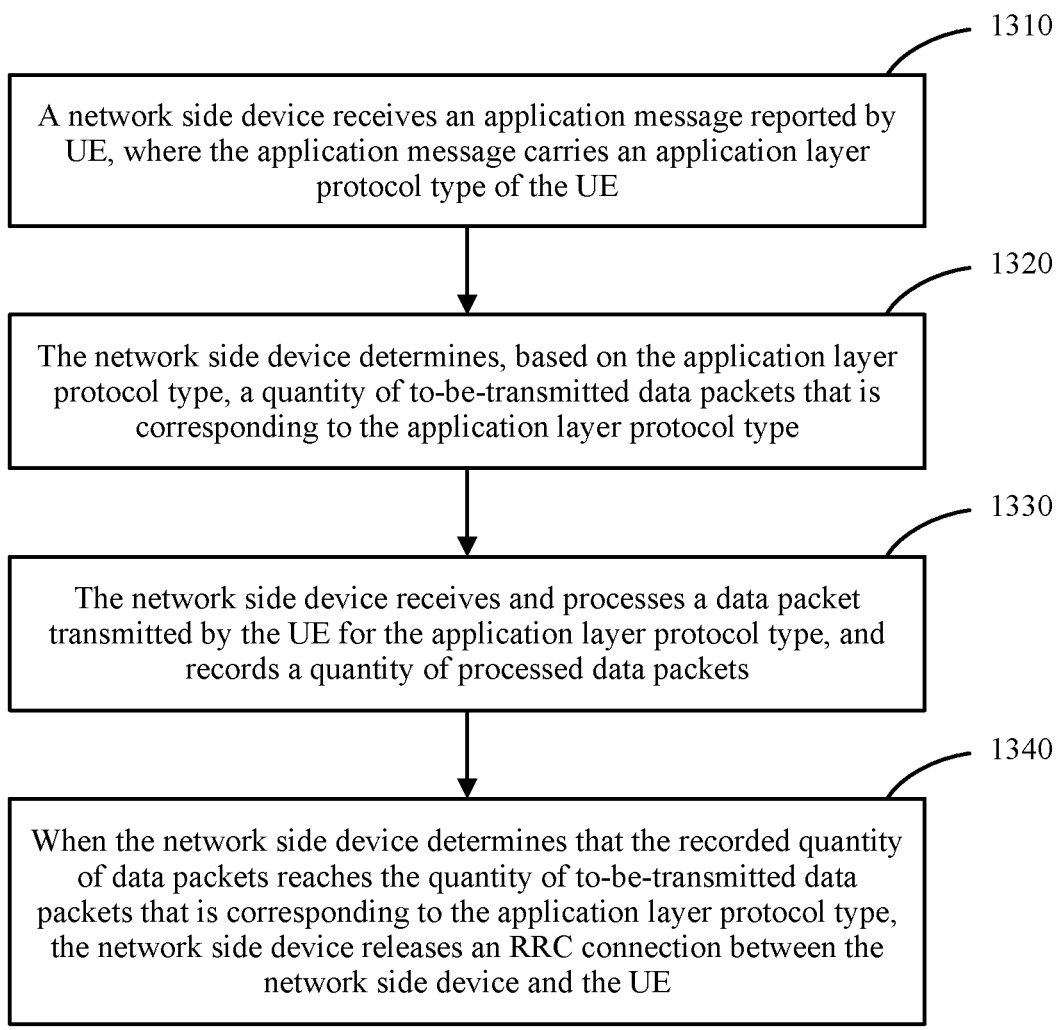
FIG. 13 is an overview flowchart C2 of RRC connection release according to an embodiment of the present disclosure.

Referring to FIG. 13, FIG. 13 is an overview flowchart C2 of RRC connection release according to an embodiment of the present disclosure.

Step 1310: A network side device receives an application message reported by UE, where the application message carries an application layer protocol type of the UE.

The network side device herein may be an eNB, or may be an MME.

Step 1320: The network side device determines, based on the application layer protocol type, a quantity of to-be-transmitted data packets that is corresponding to the application layer protocol type.

For example, as shown in FIG. 11, when the application layer protocol type reported by the UE is the TCP/HTTP, the eNB determines, based on a standard protocol process of the TCP/HTTP, that the UE needs to send six messages and receive five messages.

Step 1330: The network side device processes a data packet transmitted by the UE for the application layer protocol type, and records a quantity of processed data packets.

For example, after determining, based on the standard protocol process of the TCP/HTTP, that the UE needs to send six messages and receive five messages, the eNB records a status of performing the standard process of the TCP/HTTP by the UE. The eNB may record a quantity of messages sent by the UE and a quantity of messages received by the UE, or may record only a quantity of messages received by the UE.

Step 1340: When the network side device determines that the recorded quantity of data packets reaches the quantity of to-be-transmitted data packets that is corresponding to the application layer protocol type, the network side device releases an RRC connection between the network side device and the UE.

For example, when the eNB determines that the UE has sent six messages and receive five messages for the TCP/HTTP, the eNB releases an RRC connection between the eNB and the UE.

For another example, as shown in FIG. 12, when the UE uses the UDP protocol, the UE first needs to complete DNS resolution, and the UE transmits data after learning an address of a server. Because the UDP does not guarantee reliability of data transmission, the server returns no corresponding acknowledgement. An HTTP protocol layer generates an HTTP 200 OK that is used as UDP data, and sends the HTTP 200 OK to the UE. After receiving the HTTP 200 OK, the UE returns no corresponding acknowledgement either. When the application layer protocol type reported by the UE is the UDP, the eNB determines, based on a standard protocol process of the UDP, that the UE needs to send two messages and receive two messages. Therefore, when a recorded quantity of messages received by the UE is 2, the eNB may release the RRC connection between the eNB and the UE.

In addition, as technologies develop, an extreme case in which the UE only needs to send a message once may occur, that is, after sending an uplink data packet to the server, the UE ends data packet transmission, and releases the RRC connection. Correspondingly, after processing one data packet, the network side device releases the RRC connection between the network side device and the UE.

Therefore, it can be learned from the foregoing embodiment that the network side device learns, based on the application layer protocol type reported by the UE, a quantity of to-be-transmitted data packets required for completing the application layer protocol type, that is, a quantity of data packets that need to be received by the UE and a quantity of data packets that need to be sent by the UE, and counts data packets received by the UE and data packets sent by the UE. When determining that a counted number reaches a quantity of data packets that is stipulated for the application layer protocol type, the network side device determines that the UE release the RRC connection. This reduces signaling overheads and network resource load in an RRC connection release process.

Figure 14:
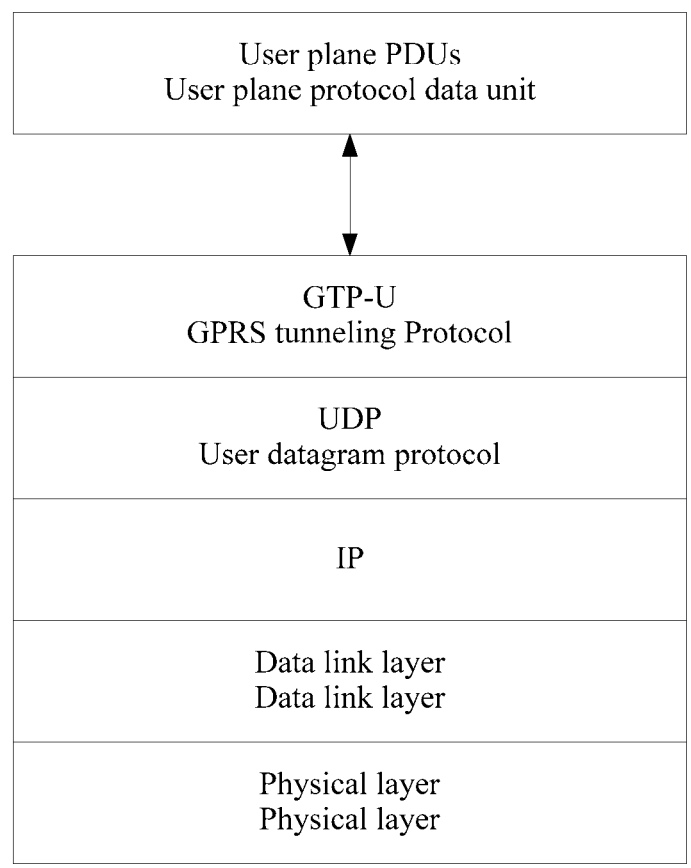
FIG. 14 is a schematic diagram of an S1 interface user plane protocol stack according to an embodiment of the present disclosure.
Figure 15A:
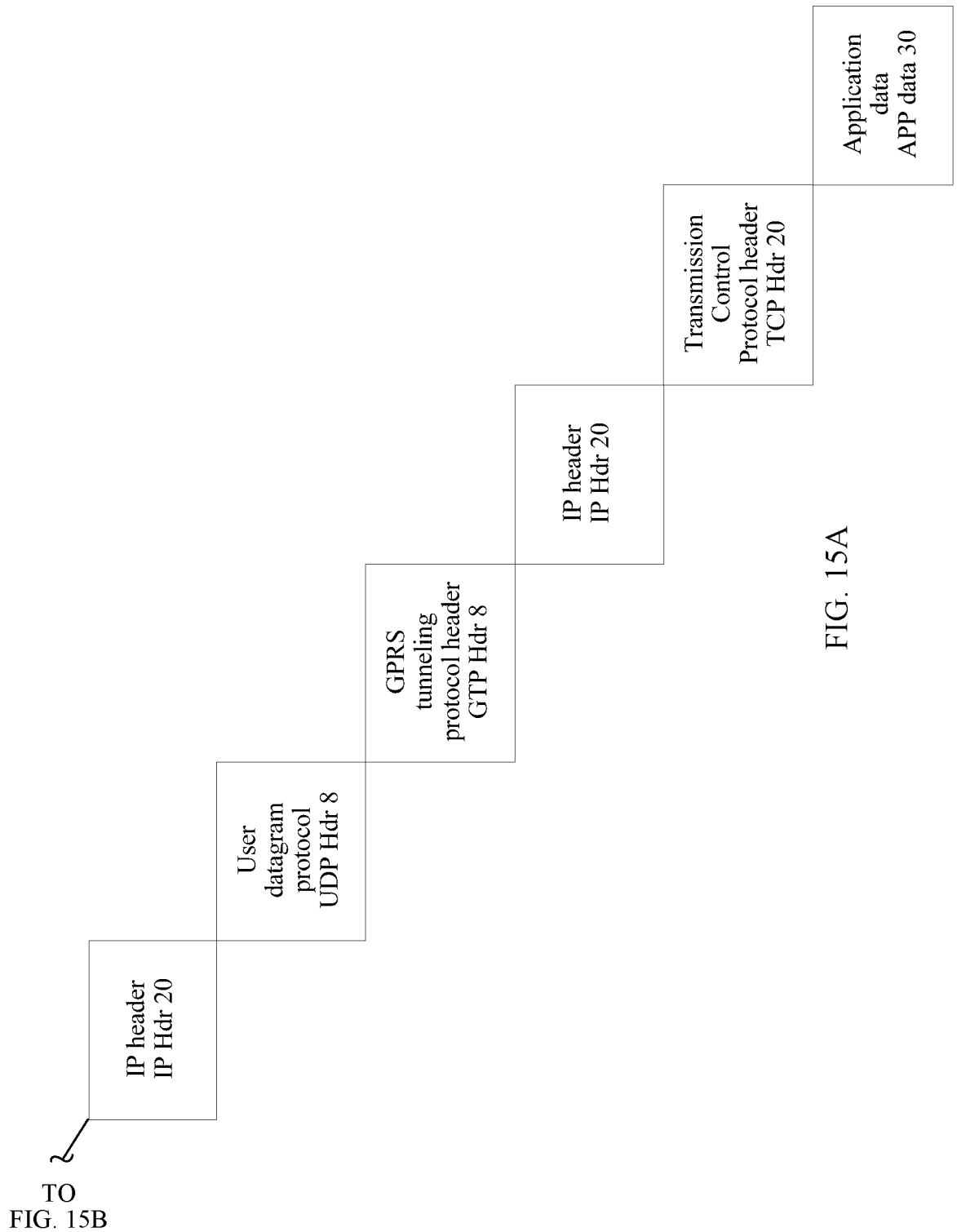
FIG. 15A and FIG. 15B are a schematic structural diagram of a transmit frame in an S1-U protocol stack according to an embodiment of the present disclosure.
Figure 15B:
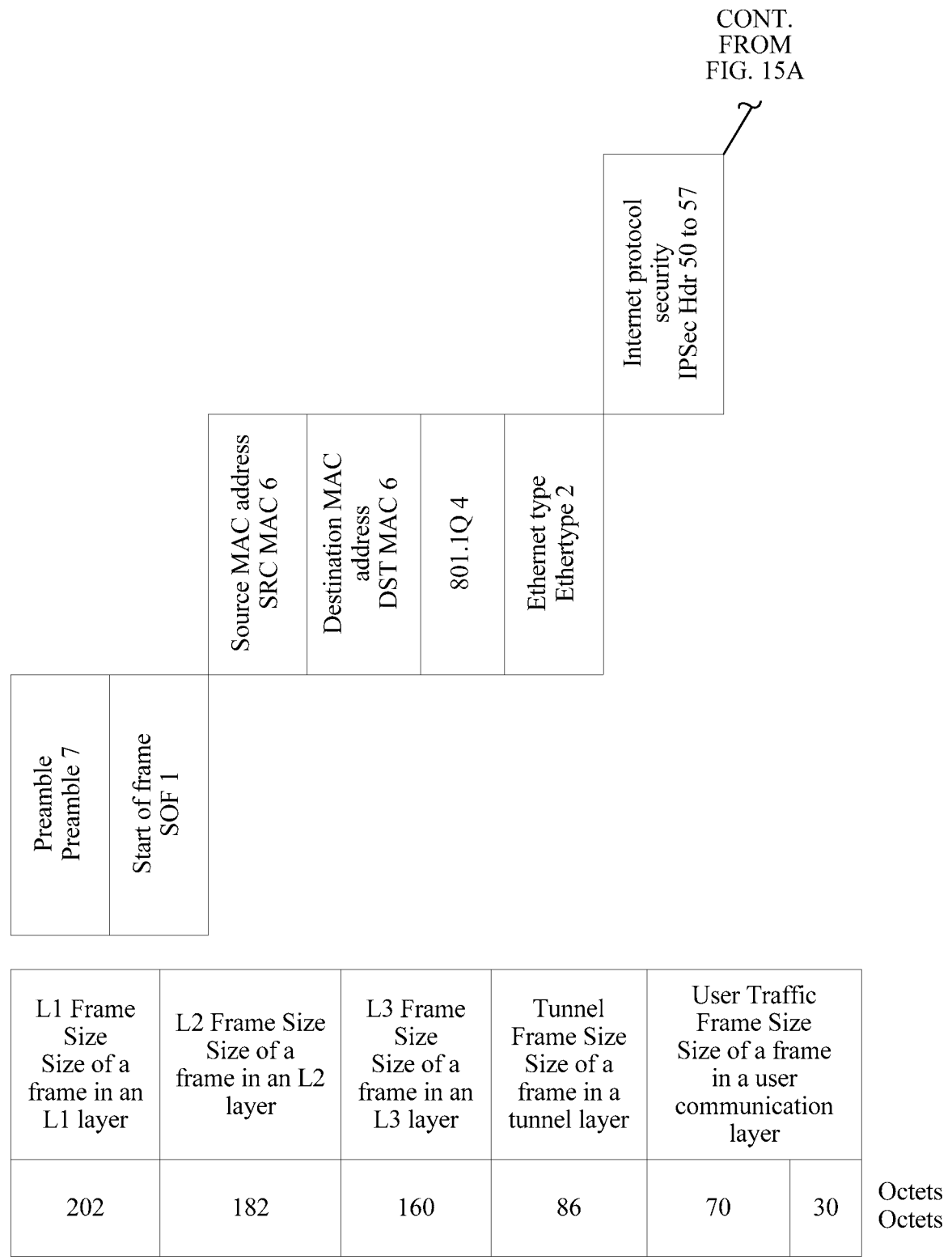

In the prior art, FIG. 14 is a schematic diagram of an S1 interface user plane protocol stack. An S1-U interface provides non-guaranteed user plane data transmission between an eNB and an S-GW. A GTP-U is located above a UDP layer and an IP layer, and is used to transmit a user plane protocol data unit (PDU). Each bearer of each UE needs a GTP-U channel to perform transmission, that is, each data packet of each UE is transmitted to a GTP-U layer after an upper layer performs corresponding processing on the data packet, and then the data packet is transmitted to a lower layer after the GTP-U layer performs corresponding processing on the data packet. In FIG. 15A and FIG. 15B, when transmission is performed by using an S1-U protocol stack, it is assumed that a size of an application layer service data unit (SDU) is 30 bytes. After a TCP/IP header is added, a size of a data frame is 70 bytes. After the data frame is transmitted to a GTP layer and a GTP header is added, the size of the data frame becomes 78 bytes. After the data frame is transmitted downwards to a UDP layer and a UDP header is added, the size of the data frame becomes 86 bytes. Therefore, the size of the frame increases each time the data frame is transmitted to a lower layer. It can be learned from FIG. 15A and FIG. 15B that a final size of the data frame is 202 bytes, which is far greater than 30 bytes that actually need to be transmitted. It can be learned that when a plurality of UEs transmit data in the S1-U, transmission load of the S1-U is relatively high, and transmission efficiency of the S1-U is low.

To improve transmission efficiency of the S1-U, a base station receives a type of UE and/or a service type that are/is reported by each UE, and the base station receives data packets sent by a plurality of UEs. The base station cascades, based on the corresponding type of the UE and/or the corresponding service type that are/is reported by each UE, data packets of UEs that meet a preset condition. Herein, the base station mainly performs a cascading operation when a size of a to-be-transmitted data packet is relatively small. Therefore, the preset condition is dedicated for specific UE or a specific service. The base station transmits the cascaded data packets by using a common channel. The common channel may be established in a process of setting up a default bearer. The base station selects one of default bearer channels as the common channel. Alternatively, the base station requests to establish a new bearer channel after determining that UE meets the preset condition.

Further, when cascading data packets of different UEs that meet the preset condition, the base station further needs to identify received data packets of all the UEs, that is, identify the different UEs based on identifiers of the UEs. An identification method may include but is not limited to the following two methods.

(1) The data packets of the different UEs are identified based on IP addresses of the UEs.

In the prior art, in a processing of setting up a default bearer, a P-GW allocates a unique IP address to each UE. The IP address is an end-to-end address, and only the UE and an MME know the address, and the eNB cannot know the address.

Therefore, to enable the eNB to distinguish between the data packets of the different UEs based on the IP addresses of the UEs, the MME needs to notify the eNB of the IP address of each UE, that is, before the base station cascades the data packets of the different UEs that meet the preset condition, the base station receives a notification message that is sent by the MME and that carries the IP address of each UE. In this way, during data transmission, the eNB and an SGW can identify UE based on an IP address following each small-sized packet in the cascaded data packets. The eNB cascades data packets of a plurality of UEs, and sends the cascaded data packets by using a common GTP-U channel. As shown in Table 1, a format of data packets that are of different UEs and that are cascaded by the eNB is as follows:

TABLE 1

| Data 1 | UE IP1 | Data 2 | UE IP2 | ... | Data n | UE IPn | GTP Header | Headers |
|---|---|---|---|---|---|---|---|---|

(2) The data packets of the different UEs are identified based on GTP IPs and GTP TEIDs of the UEs.

A GTP tunnel endpoint identifier (TEID) is used for user plane transmission between the eNB and an S-GW. In the prior art, in a process of setting up a default bearer, the eNB may learn the GTP IPs and the GTP TEIDs that are allocated by an S-GW end, and the eNB and the S-GW can distinguish between the different UEs by using the GTP IPs and the GTP TEIDs. The eNB cascades data packets of a plurality of UEs, and transmits the cascaded data packets by using a common GTP-U channel, so that the different UEs may be identified based on a GTP IP and a GTP TEID following each small-sized packet in the cascaded data packets. As shown in Table 2, a format of data packets that are of different UEs and that are cascaded by the eNB is as follows:

TABLE 2

| Data 1 | GTP IP1 + GTP TEID1 | Data 2 | GTP IP2 + GTP TEID2 | ... | Data n | GTP IPn + GTP TEIDn | GTP Header | Headers |
|---|---|---|---|---|---|---|---|---|

Figure 16:
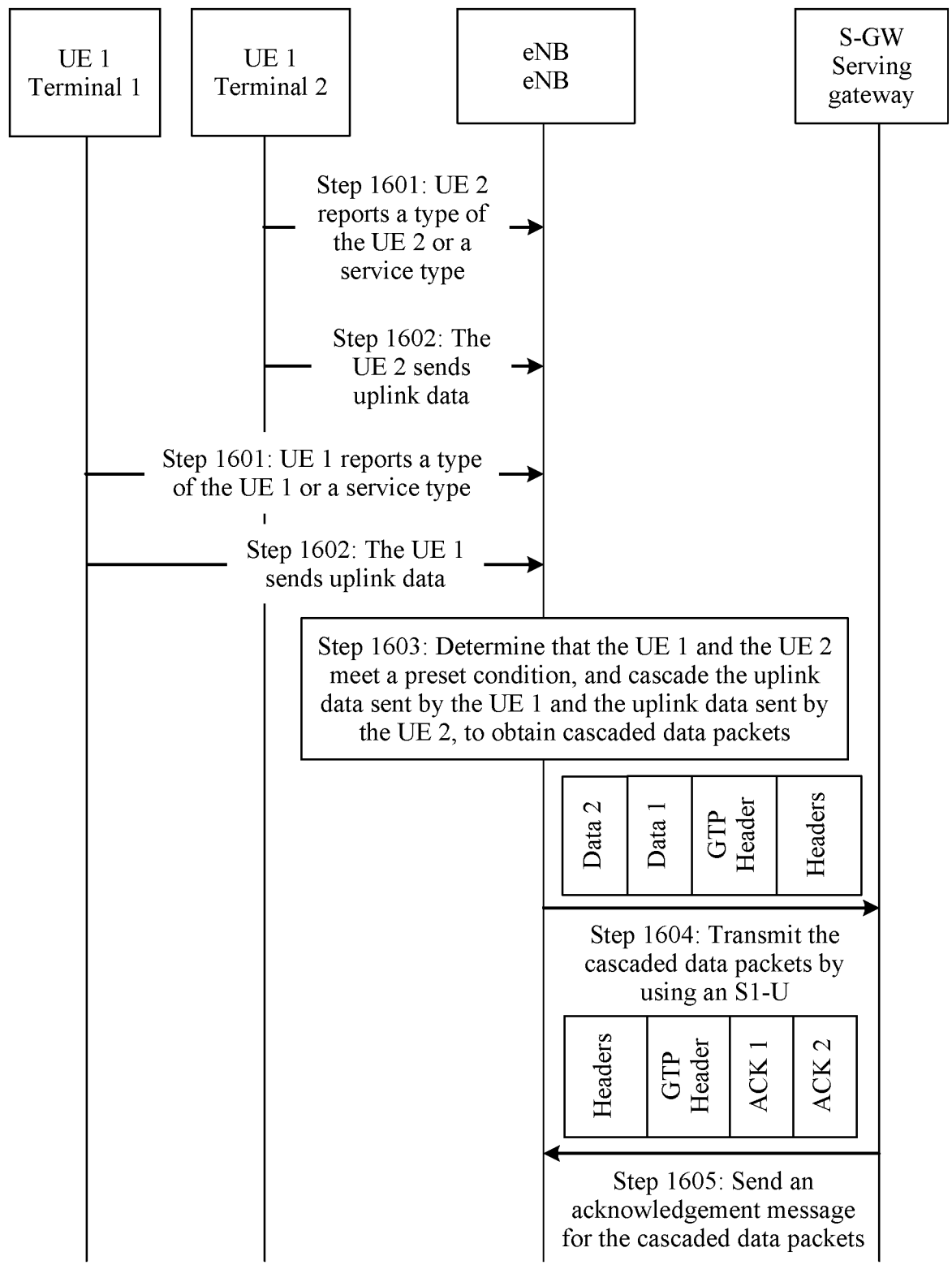
FIG. 16 is a flowchart in which an eNB cascades and transmits data packets reported by UEs according to an embodiment of the present disclosure.

Referring to FIG. 16, FIG. 16 is a flowchart in which an eNB cascades and transmits data packets reported by UEs according to an embodiment of the present disclosure.

Step 1601: UE 1 and UE 2 report types of the UEs or service types to an eNB.

Step 1602: The UE 1 and the UE 2 send uplink data to the eNB.

Step 1603: The eNB determines, based on information reported by the two UEs, that the UE 1 and the UE 2 are of special types, for example, the service type is small-sized packet transmission in the CIoT, and a preset condition is met, and the eNB cascades the uplink data of the UE 1 and the uplink data of the UE 2, to obtain cascaded data packets.

Step 1604: The eNB transmits the cascaded data packets by using an S1-U.

Step 1605: An S-GW sends an acknowledgement message for the cascaded data packets.

Therefore, in this embodiment, the base station cascades data packets of different UEs, and then transmits the cascaded data packets on a common channel. This reduces transmission load and improves transmission efficiency.

In addition, in the prior art, when a network side needs to send downlink data to UE, because an S5 user plane bearer always exists between an S-GW and a P-GW, the downlink data may be always forwarded to the S-GW. After receiving the downlink data, the S-GW notifies, by using a downlink data notification message, an MME that the network side needs to send a downlink message to the UE, and trigger the MME to send a paging message. The MME sends a paging message to all eNBs in a tracking area list (TA List) in which the UE is located. The paging message carries an SAE temporary mobile subscriber identity (S-TMSI), TA lists, and a default paging cycle of the UE. In addition, a system message sent by the eNB also includes a broadcast paging cycle, and the eNB selects a shorter paging cycle from the default paging cycle of the UE and the broadcast paging cycle in the system message, to calculate a time at which the eNB pages the UE on an air interface. When the UE paging time arrives, the eNB sends a paging message to the UE.

However, after the UE releases an RRC connection, an S1 interface between the eNB and the MME may remain connected. When the S1 interface remains connected, the MME no longer sends a paging message to the eNB, and in this case, the eNB cannot page the UE on the air interface.

For UE in a static state, this embodiment provides a solution in which the eNB determines to page the UE on an air interface. In the prior art, after the UE releases the RRC connection, the eNB and the UE reserve context information of the UE. The context information includes RRC configuration, bearer configuration, a security context, and the like.

Stored context information in this embodiment of the present disclosure further includes preset paging-related information, and the preset paging-related information includes a user identifier, TA lists, a default paging cycle of the UE, and a broadcast cycle in a system message sent by the eNB. In this case, based on the preset paging-related information recorded in the context information, the eNB can determine to-be-paged UE based on the user identifier, that is, determine UE to be paged on an air interface; determine a paging area based on the TA lists; and select a shorter paging cycle from the default paging cycle of the UE and the broadcast paging cycle in the system message, to determine a time at which the eNB pages the UE on the air interface. When the paging time arrives, the eNB sends a paging message to the UE.

Figure 17:
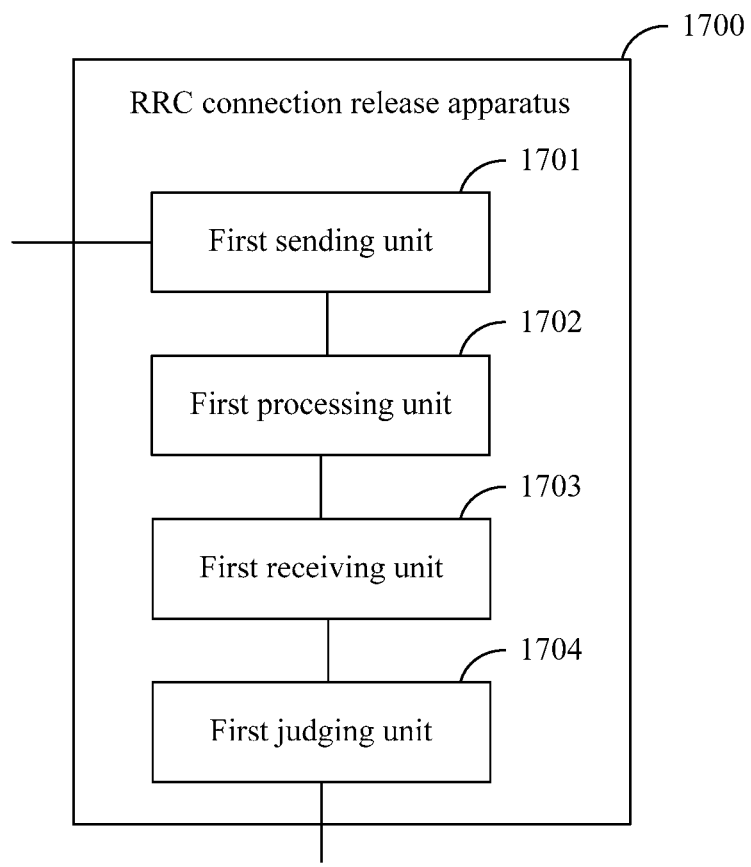
FIG. 17 is a schematic structural diagram of an RRC connection release apparatus 1700 according to an embodiment of the present disclosure.

Referring to FIG. 17, an embodiment of the present disclosure provides an RRC connection release apparatus 1700, including: a first sending unit 1701, a first processing unit 1702, a first receiving unit 1703, and a first judging unit 1704.

The first sending 1701 is configured to send a first message to a base station, where the first message carries a preset RRC release time determining parameter or a first RRC release time.

The first processing unit 1702 is configured to: when the first message carries the first RRC release time, set timing duration of a first timer based on the first RRC release time, and start the first timer; or the first receiving unit 1703 is configured to receive a response message fed back by the base station for the first message, where the response message carries a second RRC release time determined by the base station based on the preset RRC release time determining parameter, and the first processing unit 1702 is configured to: when the first message carries the preset RRC release time determining parameter, set timing duration of the first timer based on the second RRC release time, and start the first timer.

The first judging unit 1704 is configured to release an RRC connection when the first timer expires.

Optionally, the preset RRC release time determining parameter is a volume of to-be-sent uplink data of the apparatus and/or an estimated time of sending the to-be-sent uplink data.

Optionally, the first sending unit 1701 is further configured to report a BSR to the base station, where the BSR is used to instruct the base station to adjust timing duration of a second timer, and the timing duration of the second timer is set by the base station based on the first message sent by the UE.

The first receiving unit 1703 is further configured to receive a first adjustment instruction returned by the base station.

The first processing unit 1702 is further configured to: when the first adjustment instruction returned by the base station is received, adjust the timing duration of the first timer based on the first adjustment instruction.

Figure 18:
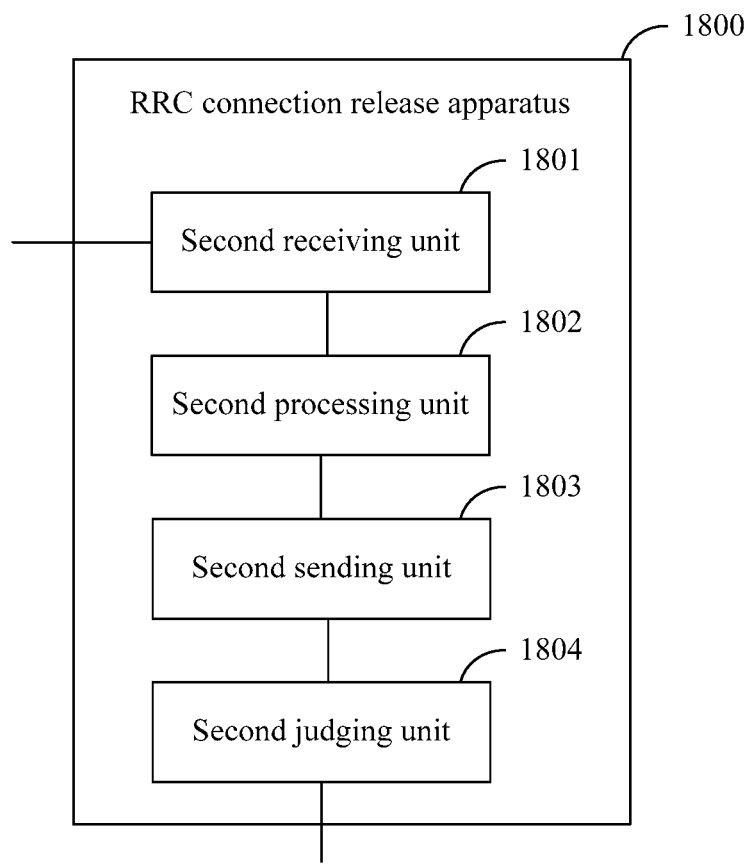
FIG. 18 is a schematic structural diagram of an RRC connection release apparatus 1800 according to an embodiment of the present disclosure.

Referring to FIG. 18, an embodiment of the present disclosure provides an RRC connection release apparatus 1800, including: a second receiving unit 1801, a second processing unit 1802, a second sending unit 1803, and a second judging unit 1804.

The second receiving unit 1801 is configured to receive a first message sent by UE, where the first message carries a preset RRC release time determining parameter or a first RRC release time.

The second processing unit 1802 is configured to: when determining that the first message carries the first RRC release time, set timing duration of a second timer based on the first RRC release time, and start the second timer; or the second processing unit 1802 is configured to: when determining that the first message carries the preset RRC release time determining parameter, determine a second RRC release time based on the preset RRC release time determining parameter, set timing duration of the second timer based on the second RRC release time, and start the second timer, and the second sending unit 1803 is configured to feed back a response message to the UE for the first message, where the response message carries the second RRC release time.

The second judging unit 1804 is configured to release, by the base station, an RRC connection between the RRC connection release apparatus 1800 and the UE when the second timer expires.

Optionally, the preset RRC release time determining parameter is a volume of to-be-sent uplink data of the UE and/or an estimated time of sending the to-be-sent uplink data.

Optionally, the second receiving unit 1801 is further configured to receive a BSR reported by the UE.

The second processing unit 1802 is further configured to: when the BSR reported by the UE is received, adjust the timing duration of the second timer, and generate a first adjustment instruction and a second adjustment instruction based on a result of adjusting the timing duration of the second timer.

The second sending unit 1803 is further configured to: return the first adjustment instruction to the UE, and notify an MME of the second adjustment instruction.

Optionally, the second receiving unit 1801 is further configured to receive an acknowledgement message sent by the UE for the response message.

The second sending unit 1803 is further configured to: after the second receiving unit receives the acknowledgement message sent by the UE for the response message, send S1 connection resume indication information to an MME, where the S1 connection resume indication information carries the timing duration of the second timer.

The second receiving unit 1801 is further configured to receive S1 connection resume confirmation indication information sent by the MME.

The second processing unit 1802 is further configured to determine, based on the S1 connection resume confirmation indication information, that an S1 connection between the base station and the MME is resumed.

Figure 19:
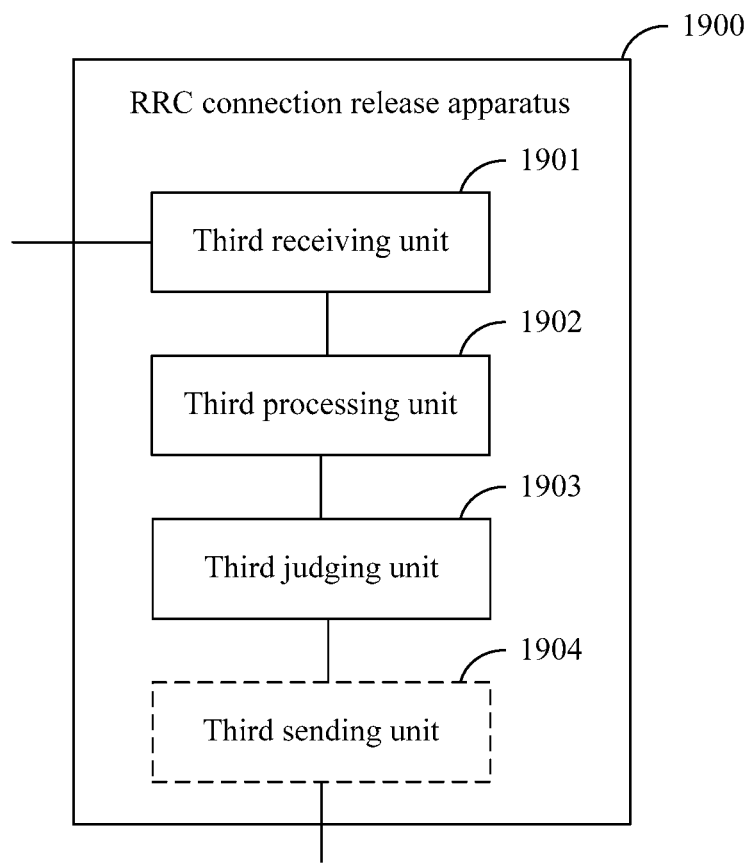
FIG. 19 is a schematic structural diagram of an RRC connection release apparatus 1900 according to an embodiment of the present disclosure.

Referring to FIG. 19, an embodiment of the present disclosure provides an RRC connection release apparatus 1900, including:

a third receiving unit 1901, configured to receive S1 connection resume indication information sent by abase station, where the S1 connection resume indication information carries timing duration of a second timer, the timing duration of the second timer is set by the base station based on a first message sent by UE, and the first message carries a preset RRC release time determining parameter or a first RRC release time;

a third processing unit 1902, configured to: set timing duration of a third timer based on the timing duration of the second timer, and start the third timer; and a third judging unit 1903, configured to: when the third timer expires, determine that the UE releases an RRC connection.

Optionally, the third processing unit 1902 is configured to determine, based on the S1 connection resume indication information, to resume an S1 connection between the RRC connection release apparatus 1900 and the base station.

A third sending unit 1904 is configured to send S1 connection resume confirmation indication information to the base station.

Optionally, the third receiving unit 1901 is further configured to receive a second adjustment instruction sent by the base station.

The third processing unit 1902 is further configured to: when the third receiving unit receives the second adjustment instruction sent by the base station, adjust the timing duration of the third timer based on the second adjustment instruction.

Figure 20:
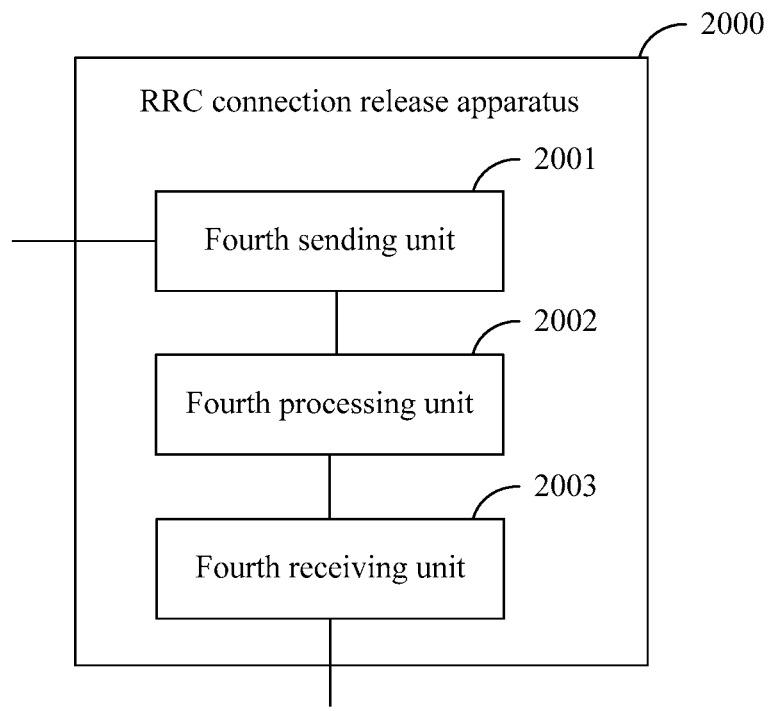
FIG. 20 is a schematic structural diagram of an RRC connection release apparatus 2000 according to an embodiment of the present disclosure.

Referring to FIG. 20, an embodiment of the present disclosure provides an RRC connection release apparatus 2000, including: a fourth sending unit 2001, a fourth processing unit 2002, and a fourth receiving unit 2003.

The fourth sending unit 2001 is configured to send a first message to abase station, where the first message carries indication information that indicates whether the UE needs to receive downlink data.

The fourth sending unit 2001 is configured to: when the fourth processing unit 2002 determines that the UE does not need to receive the downlink data, send to-be-sent uplink data to the base station, and the fourth processing unit 2002 is configured to: add an endmarker indication packet to a last uplink data packet, and after the fourth sending unit 2001 sends the last uplink data packet, release an RRC connection; and/or the fourth sending unit 2001 is configured to: when the fourth processing unit determines that the UE needs to receive the downlink data, send to-be-sent uplink data to the base station, the fourth receiving unit 2003 is configured to: when the fourth processing unit 2002 determines that the to-be-sent uplink data is sent, receive the downlink data, and the fourth processing unit 2002 is configured to: after obtaining, by means of parsing, an endmarker indication packet included in a downlink data packet received by the fourth receiving unit, release an RRC connection.

Optionally, the fourth processing unit 2002 is further configured to add the endmarker indication packet to a PDCP header of the last uplink data packet of the to-be-sent uplink data.

Figure 21:
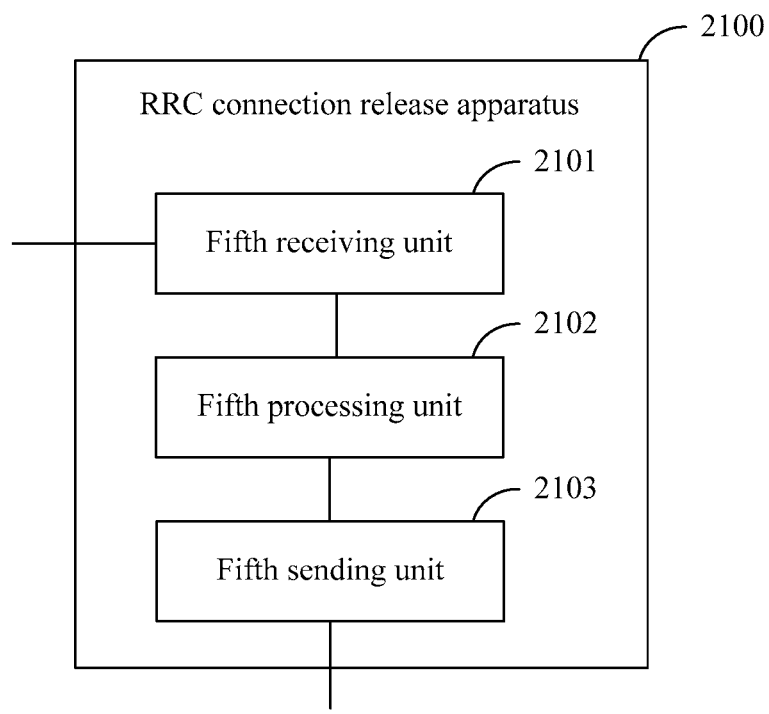
FIG. 21 is a schematic structural diagram of an RRC connection release apparatus 2100 according to an embodiment of the present disclosure.

Referring to FIG. 21, an embodiment of the present disclosure provides an RRC connection release apparatus 2100, including: a fifth receiving unit 2101, a fifth processing unit 2102, and a fifth sending unit 2103.

The fifth receiving unit 2101 is configured to receive a first message sent by UE, where the first message carries indication information that indicates whether the UE needs to receive downlink data.

The fifth receiving unit 2101 is configured to: when the fifth processing unit 2102 determines that the indication information indicates that the UE does not need to receive the downlink data, receive to-be-sent uplink data sent by the UE, and the fifth processing unit 2102 is configured to: after obtaining, by means of parsing, an endmarker indication packet included in an uplink data packet received by the fifth receiving unit, release an RRC connection between the RRC connection release apparatus 2100 and the UE; and/or the fifth receiving unit 2101 is configured to: when the fifth processing unit 2102 determines that the indication information indicates that the UE needs to receive the downlink data, receive to-be-sent uplink data sent by the UE, the fifth sending unit 2103 is configured to: after the fifth receiving unit receives the to-be-sent uplink data sent by the UE, continue to send the downlink data to the UE, and the fifth processing unit 2102 is configured to: when the fifth sending unit sends a last downlink data packet, add an endmarker indication packet to the last downlink data packet, and after the last downlink data packet that carries the endmarker indication packet is sent to the UE, release an RRC connection between the RRC connection release apparatus 2100 and the UE.

Optionally, the fifth processing unit 2102 is further configured to: when determining that the indication information indicates that the UE does not need to receive the downlink data, after obtaining, by means of parsing, the endmarker indication packet from the to-be-sent uplink data sent by the UE, add the endmarker indication packet to a GPRS tunneling protocol GTP header of a last uplink data packet of the to-be-sent uplink data, and send the last uplink data packet to a serving gateway S-GW.

When determining that the indication information indicates that the UE needs to receive the downlink data, and adding the endmarker indication packet to the last downlink data packet, the fifth processing unit 2102 is further configured to:

after obtaining, by means of parsing, the endmarker indication packet from the downlink data sent by the S-GW, determine that the last downlink data packet is received; and add the endmarker indication packet to a PDCP header of the last downlink data packet.

Figure 22:
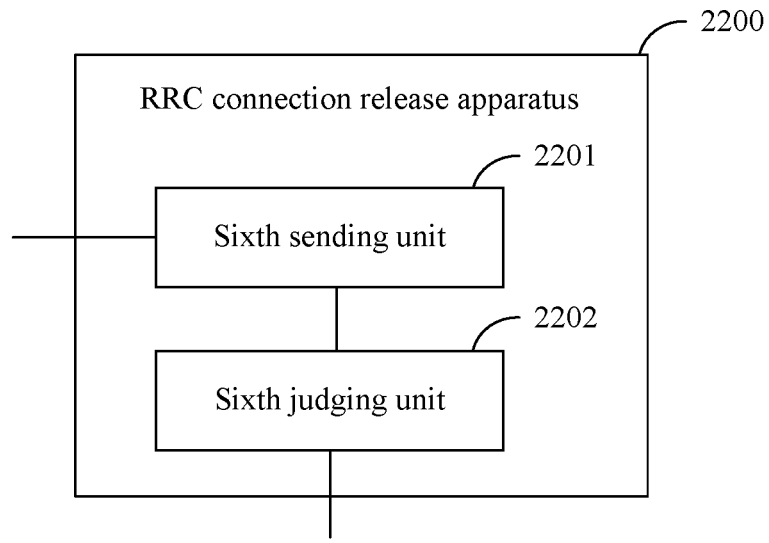
FIG. 22 is a schematic structural diagram of an RRC connection release apparatus 2200 according to an embodiment of the present disclosure.

Referring to FIG. 22, an embodiment of the present disclosure provides an RRC connection release apparatus 2200, including:

a sixth sending unit 2201, configured to report an application message to a network side device, where the application message carries an application layer protocol type of the UE; and a sixth judging unit 2202, configured to: after all data packets required for the application layer protocol type are exchanged with the network side device, release an RRC connection.

Optionally, the application layer protocol type is a TCP/HTTP or a UDP.

Figure 23:
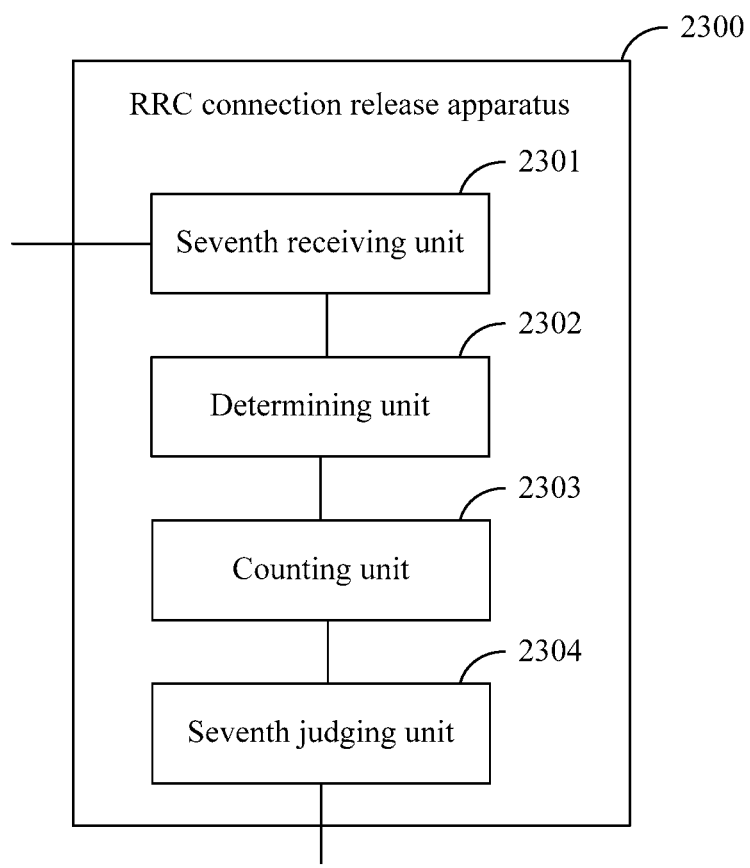
FIG. 23 is a schematic structural diagram of an RRC connection release apparatus 2300 according to an embodiment of the present disclosure.

Referring to FIG. 23, an embodiment of the present disclosure provides an RRC connection release apparatus 2300, including:

a seventh receiving unit 2301, configured to receive an application message reported by UE, where the application message carries an application layer protocol type of the UE;

a determining unit 2302, configured to determine, based on the application layer protocol type, a quantity of to-be-transmitted data packets that is corresponding to the application layer protocol type;

a counting unit 2303, configured to: receive and process a data packet transmitted by the UE for the application layer protocol type, and record a quantity of processed data packets; and a seventh judging unit 2304, configured to: when determining that the recorded quantity of data packets reaches the quantity of to-be-transmitted data packets that is corresponding to the application layer protocol type, release an RRC connection between the RRC connection release apparatus 2300 and the UE.

It should be noted that division of modules in the embodiments of the present disclosure is an example, and is merely logical function division. There may be another division manner in actual implementation. In addition, function modules in the embodiments of this application may be integrated into one processing module, or each module may exist alone physically, or two or more modules may be integrated into one module. The integrated module may be implemented in a form of hardware, or may be implemented in a form of a software function module.

When the integrated module is implemented in the form of a software function module and sold or used as an independent product, the integrated module may be stored in a computer readable storage medium. Based on such understanding, the technical solutions of this application or a part contributing to the prior art, or all or a part of the technical solutions may be represented in a form of a software product. The computer software product is stored in a storage medium, and includes a plurality of instructions used to enable one computer device (which may be a personal computer, a server, a network device, or the like) or a processor (processor) to perform all or some steps of the method in the embodiments of the present disclosure. The foregoing storage medium includes any medium that can store program code, such as a USB flash drive, a removable hard disk, a read-only memory (ROM), a random access memory (RAM), a magnetic disk, or an optical disc.

Figure 24:
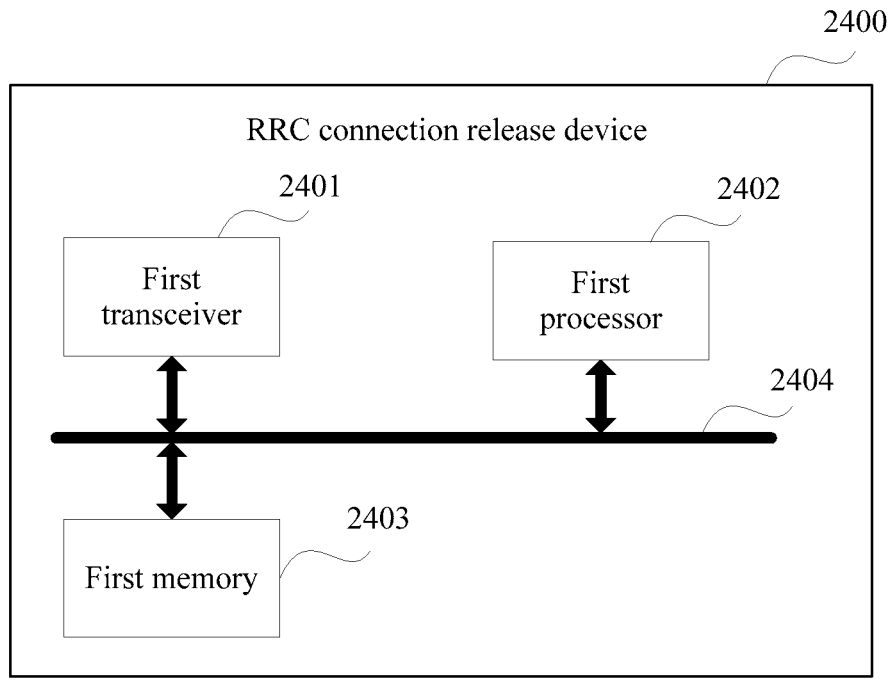
FIG. 24 shows an RRC connection release device 2400 according to an embodiment of the present disclosure.

Referring to FIG. 24, an embodiment of the present disclosure provides an RRC connection release device 2400, including: a first transceiver 2401, a first processor 2402, and a first memory 2403. The first transceiver 2401, the first processor 2402, and the first memory 2403 are connected to each other. This embodiment of the present disclosure imposes no limitation on a specific connection medium between the parts. In this embodiment of the present disclosure, in FIG. 24, the first memory 2403, the first processor 2402, and the first transceiver 2401 are connected by using a bus 2404. The bus is represented by using a bold line in FIG. 24. A manner of connection between other parts is merely an example for description, and is not constructed as limitation. The bus may be classified into an address bus, a data bus, a control bus, and the like. For ease of denotation, the bus is represented by using only one bold line in FIG. 24, but it does not indicate that there is only one bus or only one type of bus.

The first memory 2403 in this embodiment of the present disclosure is configured to store program code executed by the first processor 2402, and may be a volatile memory, such as a random-access memory (RAM). Alternatively, the first memory 2403 may be a nonvolatile memory, such as a read-only memory (ROM), a flash memory, a hard disk drive (HDD), or a solid-state drive (SSD). Alternatively, the first memory 2403 is any other medium that can be used to carry or store expected program code in a command or data structure form and that can be accessed by a computer. However, this is not limited herein. The first memory 2403 may be a combination of the memories.

The first transceiver 2401 is configured to send a first message to a base station, where the first message carries a preset RRC release time determining parameter or a first RRC release time.

The first processor 2402 is configured to: when the first message carries the first RRC release time, set timing duration of a first timer based on the first RRC release time, and start the first timer; or the first transceiver 2401 is configured to: when the first message carries the preset RRC release time determining parameter, receive a response message fed back by the base station for the first message, where the response message carries a second RRC release time determined by the base station based on the preset RRC release time determining parameter, and the first processor 2402 is configured to: set timing duration of the first timer based on the second RRC release time, and start the first timer.

The first processor 2402 is further configured to release an RRC connection when the first timer expires.

Optionally, the preset RRC release time determining parameter is a volume of to-be-sent uplink data of the UE and/or an estimated time of sending the to-be-sent uplink data.

Optionally, the first transceiver 2401 is further configured to: report a BSR to the base station, where the BSR is used to instruct the base station to adjust timing duration of a second timer, and the timing duration of the second timer is set by the base station based on the first message sent by UE; and receive a first adjustment instruction returned by the base station.

The first processor 2402 is further configured to: when the first adjustment instruction returned by the base station is received, adjust the timing duration of the first timer based on the first adjustment instruction.

Figure 25:
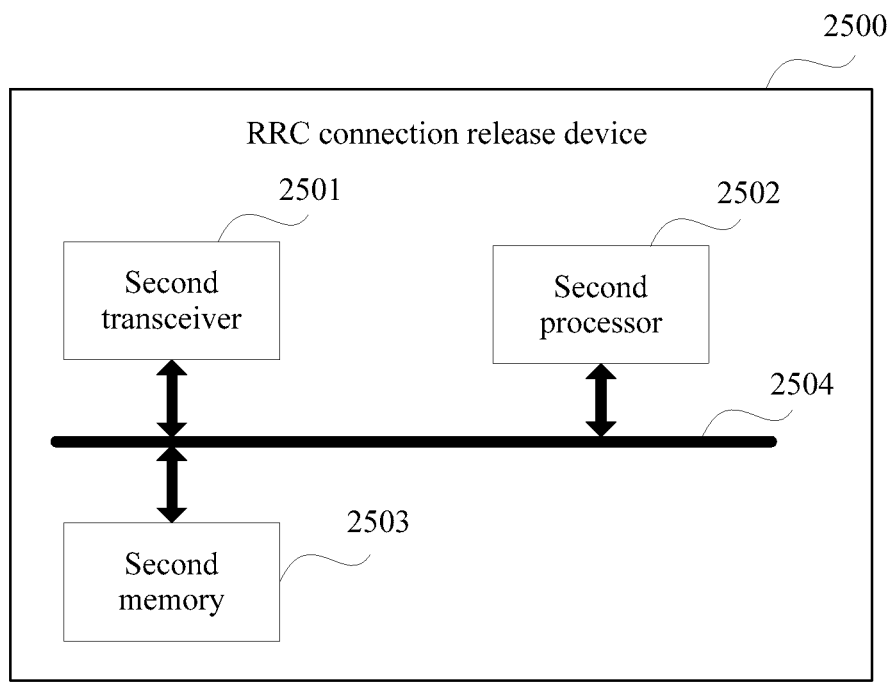
FIG. 25 shows an RRC connection release device 2500 according to an embodiment of the present disclosure.

Referring to FIG. 25, an embodiment of the present disclosure provides an RRC connection release device 2500, including:

As shown in FIG. 25, the device includes a second transceiver 2501, a second processor 2502, and a second memory 2503. The second transceiver 2501, the second processor 2502, and the second memory 2503 are connected to each other. This embodiment of the present disclosure imposes no limitation on a specific connection medium between the parts. In this embodiment of the present disclosure, in FIG. 25, the second memory 2503, the second processor 2502, and the second transceiver 2501 are connected by using a bus 2504. The bus is represented by using a bold line in FIG. 25. A manner of connection between other parts is merely an example for description, and is not constructed as limitation. The bus may be classified into an address bus, a data bus, a control bus, and the like. For ease of denotation, the bus is represented by using only one bold line in FIG. 25, but it does not indicate that there is only one bus or only one type of bus.

The second memory 2503 in this embodiment of the present disclosure is configured to store program code executed by the second processor 2502, and may be a volatile memory, such as a random-access memory (RAM). Alternatively, the second memory 2503 may be a nonvolatile memory, such as a read-only memory (ROM), a flash memory, a hard disk drive (HDD), or a solid-state drive (SSD). Alternatively, the second memory 2503 is any other medium that can be used to carry or store expected program code in a command or data structure form and that can be accessed by a computer. However, this is not limited herein. The second memory 2503 may be a combination of the memories.

The second transceiver 2501 is configured to receive a first message sent by UE, where the first message carries a preset RRC release time determining parameter or a first RRC release time.

The second processor 2502 configured to: when determining that the first message carries the first RRC release time, set timing duration of a second timer based on the first RRC release time, and start the second timer; or the second processor 2502 is configured to: when determining that the first message carries the preset RRC release time determining parameter, determine a second RRC release time based on the preset RRC release time determining parameter, set timing duration of the second timer based on the second RRC release time, and start the second timer, and the second transceiver 2501 is configured to feed back a response message to the UE for the first message, where the response message carries the second RRC release time.

The second processor 2502 is further configured to release an RRC connection between the RRC connection release device 2500 and the UE when the second timer expires.

Optionally, the preset RRC release time determining parameter is a volume of to-be-sent uplink data of the UE and/or an estimated time of sending the to-be-sent uplink data.

Optionally, the second transceiver 2501 is further configured to receive a BSR reported by the UE.

The second processor 2502 is further configured to: when the second transceiver 2501 receives the BSR reported by the UE, adjust the timing duration of the second timer, and generate a first adjustment instruction and a second adjustment instruction based on a result of adjusting the timing duration of the second timer.

The second transceiver 2501 is further configured to: return the first adjustment instruction to the UE, and notify an MME of the second adjustment instruction.

Optionally, the second transceiver 2501 is further configured to: receive an acknowledgement message sent by the UE for the response message; after receiving the acknowledgement message sent by the UE for the response message, send S1 connection resume indication information to an MME, where the S1 connection resume indication information carries the timing duration of the second timer; and receive S1 connection resume confirmation indication information sent by the MME.

The second processor 2502 is configured to determine, based on the S1 connection resume confirmation indication information, that an S1 connection between the base station and the MME is resumed.

Figure 26:
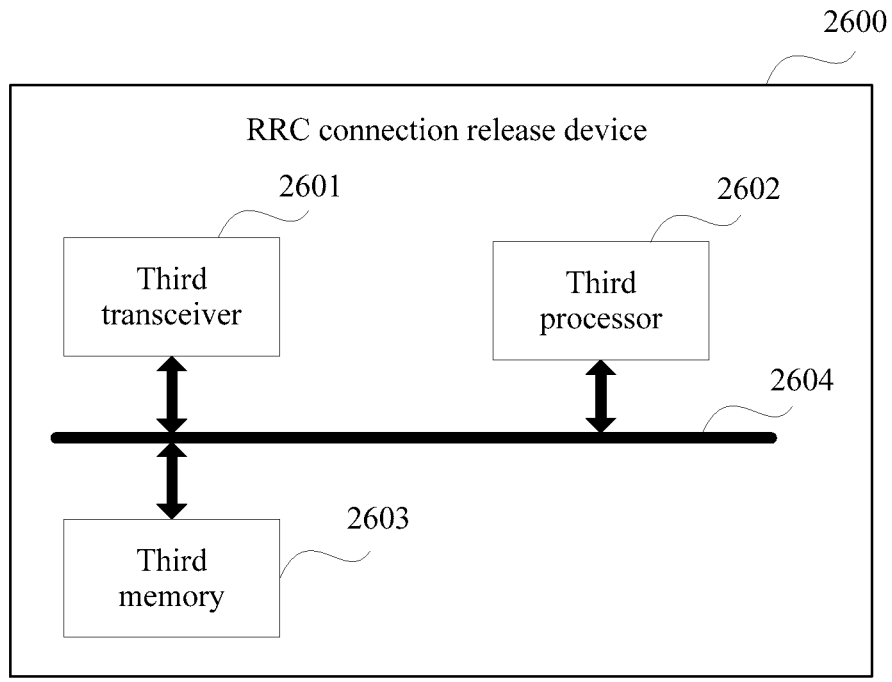
FIG. 26 shows an RRC connection release device 2600 according to an embodiment of the present disclosure.

Referring to FIG. 26, an embodiment of the present disclosure provides an RRC connection release device 2600, including:

As shown in FIG. 26, the device includes a third transceiver 2601, a third processor 2602, and a third memory 2603. The third transceiver 2601, the third processor 2602, and the third memory 2603 are connected to each other. This embodiment of the present disclosure imposes no limitation on a specific connection medium between the parts. In this embodiment of the present disclosure, in FIG. 26, the third memory 2603, the third processor 2602, and the third transceiver 2601 are connected by using a bus 2604. The bus is represented by using a bold line in FIG. 26. A manner of connection between other parts is merely an example for description, and is not constructed as limitation. The bus may be classified into an address bus, a data bus, a control bus, and the like. For ease of denotation, the bus is represented by using only one bold line in FIG. 26, but it does not indicate that there is only one bus or only one type of bus.

The third memory 2603 in this embodiment of the present disclosure is configured to store program code executed by the third processor 2602, and may be a volatile memory, such as a random-access memory (RAM). Alternatively, the third memory 2603 may be a nonvolatile memory, such as a read-only memory (ROM), a flash memory, a hard disk drive (HDD), or a solid-state drive (SSD). Alternatively, the third memory 2603 is any other medium that can be used to carry or store expected program code in a command or data structure form and that can be accessed by a computer. However, this is not limited herein. The third memory 2603 may be a combination of the memories.

The third transceiver 2601 is configured to receive S1 connection resume indication information sent by abase station, where the S1 connection resume indication information carries timing duration of a second timer, the timing duration of the second timer is set by the base station based on a first message sent by UE, and the first message carries a preset RRC release time determining parameter or a first RRC release time.

The third processor 2602 is configured to: set timing duration of a third timer based on the timing duration of the second timer, start the third timer, and when the third timer expires, determine that the UE releases an RRC connection.

Optionally, the third processor 2602 is further configured to determine, based on the S1 connection resume indication information, to resume an S1 connection between RRC connection release device 2600 and the base station.

The third transceiver 2601 is further configured to send S1 connection resume confirmation indication information to the base station.

Optionally, the third transceiver 2601 is configured to receive a second adjustment instruction sent by the base station.

The third processor 2602 is configured to adjust the timing duration of the third timer based on the second adjustment instruction.

Figure 27:
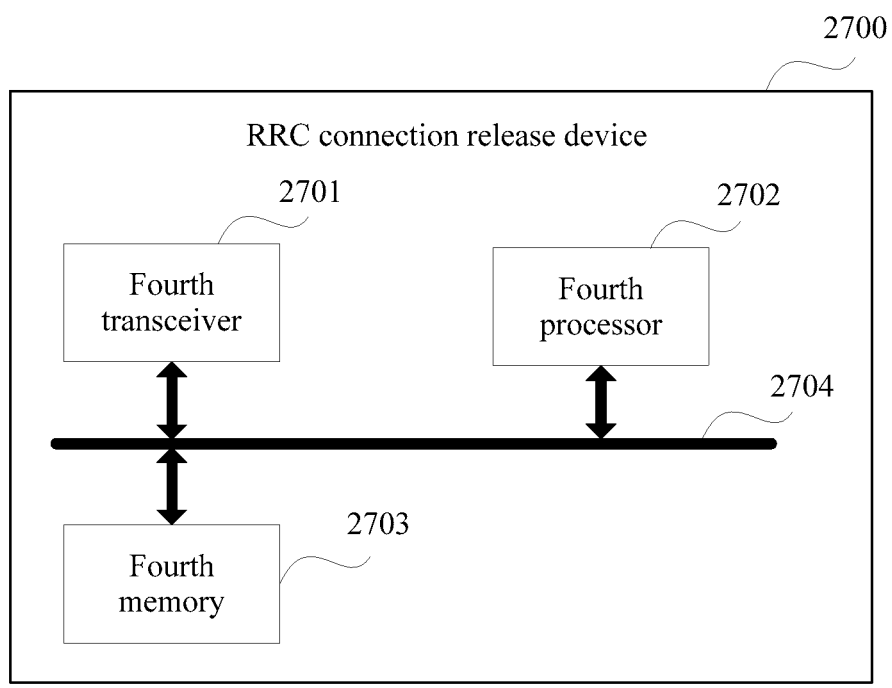
FIG. 27 shows an RRC connection release device 2700 according to an embodiment of the present disclosure.

Referring to FIG. 27, an embodiment of the present disclosure provides an RRC connection release device 2700, including:

As shown in FIG. 27, the device includes a fourth transceiver 2701, a fourth processor 2702, and a fourth memory 2703. The fourth transceiver 2701, the fourth processor 2702, and the fourth memory 2703 are connected to each other. This embodiment of the present disclosure imposes no limitation on a specific connection medium between the parts. In this embodiment of the present disclosure, in FIG. 27, the fourth memory 2703, the fourth processor 2702, and the fourth transceiver 2701 are connected by using a bus 2704. The bus is represented by using a bold line in FIG. 27. A manner of connection between other parts is merely an example for description, and is not constructed as limitation. The bus may be classified into an address bus, a data bus, a control bus, and the like. For ease of denotation, the bus is represented by using only one bold line in FIG. 27, but it does not indicate that there is only one bus or only one type of bus.

The fourth memory 2703 in this embodiment of the present disclosure is configured to store program code executed by the fourth processor 2702, and may be a volatile memory, such as a random-access memory (RAM). Alternatively, the fourth memory 2703 may be a nonvolatile memory, such as a read-only memory (ROM), a flash memory, a hard disk drive (HDD), or a solid-state drive (SSD). Alternatively, the fourth memory 2703 is any other medium that can be used to carry or store expected program code in a command or data structure form and that can be accessed by a computer. However, this is not limited herein. The fourth memory 2703 may be a combination of the memories.

The fourth transceiver 2701 is configured to send a first message to abase station, where the first message carries indication information that indicates whether the UE needs to receive downlink data.

The fourth transceiver 2701 is configured to: when the fourth processor 2702 determines that the UE does not need to receive the downlink data, send to-be-sent uplink data to the base station, and the fourth processor 2702 is configured to: add an endmarker indication packet to a last uplink data packet, and after the fourth transceiver 2701 sends the last uplink data packet, release an RRC connection; and/or the fourth transceiver 2701 is configured to: when the fourth processor 2702 determines that the UE needs to receive the downlink data, receive the downlink data after sending to-be-sent uplink data, and the fourth processor 2702 is configured to: after obtaining, by means of parsing, an endmarker indication packet included in a received downlink data packet, release an RRC connection.

Optionally, the fourth processor 2702 is further configured to add the endmarker indication packet to a PDCP header of the last uplink data packet of the to-be-sent uplink data.

Figure 28:
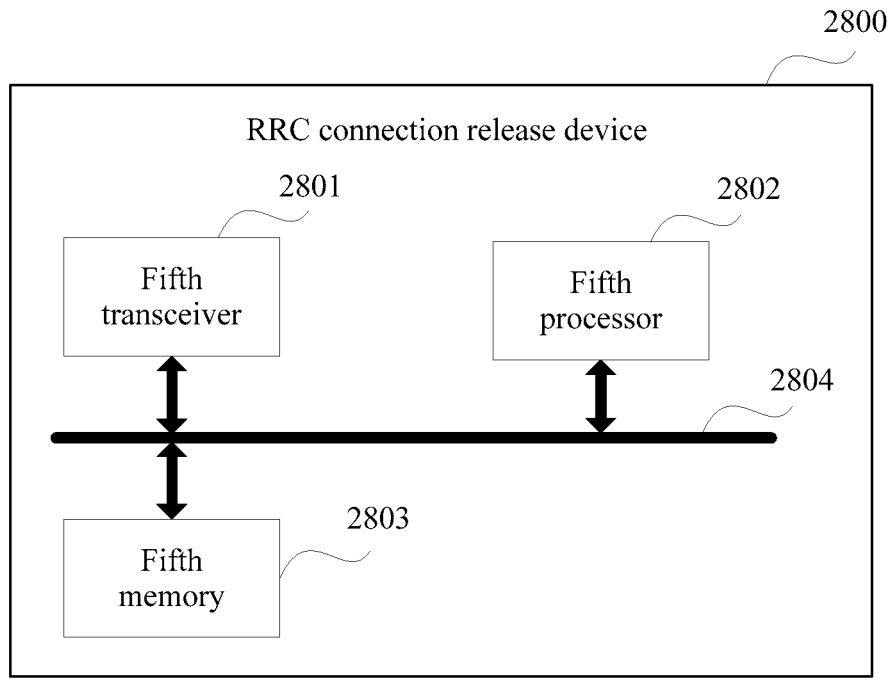
FIG. 28 shows an RRC connection release device 2800 according to an embodiment of the present disclosure.

Referring to FIG. 28, an embodiment of the present disclosure provides an RRC connection release device 2800, including:

As shown in FIG. 28, the device includes a fifth transceiver 2801, a fifth processor 2802, and a fifth memory 2803. The fifth transceiver 2801, the fifth processor 2802, and the fifth memory 2803 are connected to each other. This embodiment of the present disclosure imposes no limitation on a specific connection medium between the parts. In this embodiment of the present disclosure, in FIG. 28, the fifth memory 2803, the fifth processor 2802, and the fifth transceiver 2801 are connected by using a bus 2804. The bus is represented by using a bold line in FIG. 28. A manner of connection between other parts is merely an example for description, and is not constructed as limitation. The bus may be classified into an address bus, a data bus, a control bus, and the like. For ease of denotation, the bus is represented by using only one bold line in FIG. 28, but it does not indicate that there is only one bus or only one type of bus.

The fifth memory 2803 in this embodiment of the present disclosure is configured to store program code executed by the fifth processor 2802, and may be a volatile memory, such as a random-access memory (RAM). Alternatively, the fifth memory 2803 may be a nonvolatile memory, such as a read-only memory (ROM), a flash memory, a hard disk drive (HDD), or a solid-state drive (SSD). Alternatively, the fifth memory 2803 is any other medium that can be used to carry or store expected program code in a command or data structure form and that can be accessed by a computer. However, this is not limited herein. The fifth memory 2803 may be a combination of the memories.

The fifth transceiver 2801 is configured to receive a first message sent by UE, where the first message carries indication information that indicates whether the UE needs to receive downlink data.

The fifth transceiver 2801 is configured to: when the fifth processor 2802 determines that the indication information indicates that the UE does not need to receive the downlink data, receive to-be-sent uplink data sent by the UE, and the fifth processor 2802 is configured to: after obtaining, by means of parsing, an endmarker indication packet included in a received uplink data packet, release an RRC connection between the RRC connection release device 2800 and the UE; and/or the fifth transceiver 2801 is configured to: when the fifth processor 2802 determines that the indication information indicates that the UE needs to receive the downlink data, continue to send the downlink data to the UE after receiving to-be-sent uplink data sent by the UE, and the fifth processor 2802 is configured to: when the fifth transceiver sends a last downlink data packet, add an endmarker indication packet to the last downlink data packet, and after the fifth transceiver 2801 sends, to the UE, the last downlink data packet that carries the endmarker indication packet, release an RRC connection between the RRC connection release device 2800 and the UE.

Optionally, the fifth processor 2802 is further configured to: when determining that the indication information indicates that the UE does not need to receive the downlink data, after obtaining, by means of parsing, the endmarker indication packet from the to-be-sent uplink data sent by the UE, add the endmarker indication packet to a GPRS tunneling protocol GTP header of a last uplink data packet of the to-be-sent uplink data, and send the last uplink data packet to a serving gateway S-GW.

When determining that the indication information indicates that the UE needs to receive the downlink data, and adding the endmarker indication packet to the last downlink data packet, the fifth processor 2802 is further configured to:

after obtaining, by means of parsing, the endmarker indication packet from the downlink data sent by the S-GW, determine that the last downlink data packet is received; and add the endmarker indication packet to a PDCP header of the last downlink data packet.

Figure 29:
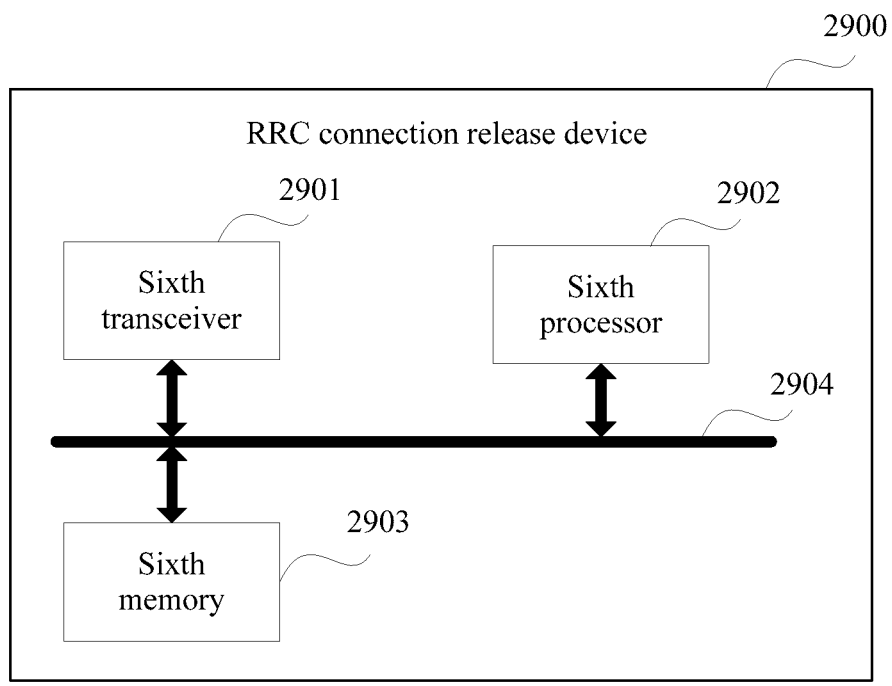
FIG. 29 shows an RRC connection release device 2900 according to an embodiment of the present disclosure.

Referring to FIG. 29, an embodiment of the present disclosure provides an RRC connection release device 2900, including:

As shown in FIG. 29, the device includes a sixth transceiver 2901, a sixth processor 2902, and a sixth memory 2903. The sixth transceiver 2901, the sixth processor 2902, and the sixth memory 2903 are connected to each other. This embodiment of the present disclosure imposes no limitation on a specific connection medium between the parts. In this embodiment of the present disclosure, in FIG. 29, the sixth memory 2903, the sixth processor 2902, and the sixth transceiver 2901 are connected by using a bus 2904. The bus is represented by using a bold line in FIG. 29. A manner of connection between other parts is merely an example for description, and is not constructed as limitation. The bus may be classified into an address bus, a data bus, a control bus, and the like. For ease of denotation, the bus is represented by using only one bold line in FIG. 29, but it does not indicate that there is only one bus or only one type of bus.

The sixth memory 2903 in this embodiment of the present disclosure is configured to store program code executed by the sixth processor 2902, and may be a volatile memory, such as a random-access memory (RAM). Alternatively, the sixth memory 2903 may be a nonvolatile memory), such as a read-only memory (ROM), a flash memory, a hard disk drive (HDD), or a solid-state drive (SSD). Alternatively, the sixth memory 2903 is any other medium that can be used to carry or store expected program code in a command or data structure form and that can be accessed by a computer. However, this is not limited herein. The sixth memory 2903 may be a combination of the memories.

The sixth transceiver 2901 is configured to report an application message to a network side device, where the application message carries an application layer protocol type of the UE.

The sixth processor 2902 is configured to: after all data packets required for the application layer protocol type are exchanged with the network side device, release an RRC connection.

Optionally, the application layer protocol type is a TCP/HTTP or a UDP.

Figure 30:
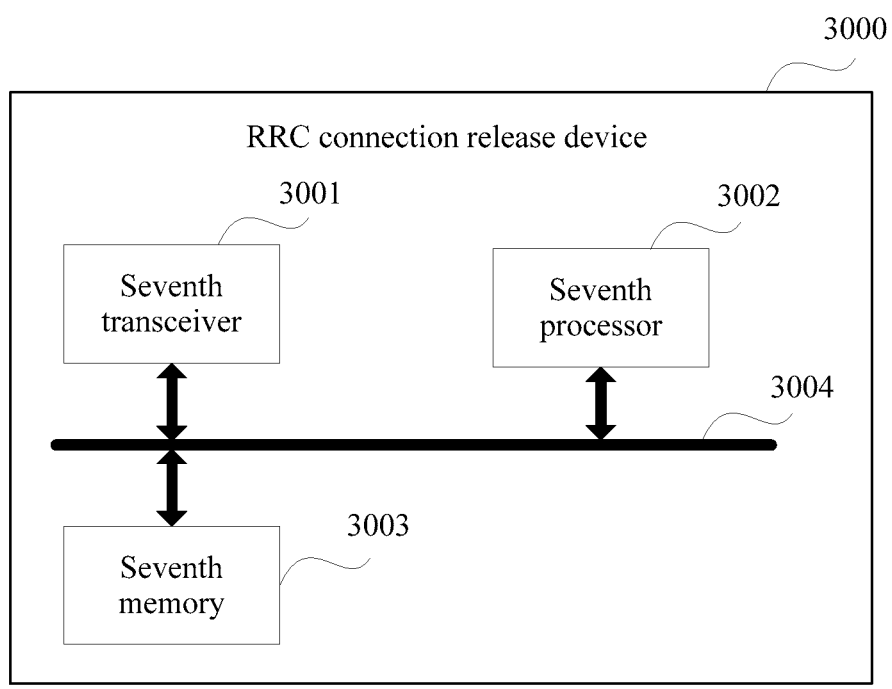
FIG. 30 shows an RRC connection release device 3000 according to an embodiment of the present disclosure.

Referring to FIG. 30, an embodiment of the present disclosure provides a network side device 3000, including:

As shown in FIG. 30, the device includes a seventh transceiver 3001, a seventh processor 3002, and a seventh memory 3003. The seventh transceiver 3001, the seventh processor 3002, and the seventh memory 3003 are connected to each other. This embodiment of the present disclosure imposes no limitation on a specific connection medium between the parts. In this embodiment of the present disclosure, in FIG. 30, the seventh memory 3003, the seventh processor 3002, and the seventh transceiver 3001 are connected by using a bus 3004. The bus is represented by using a bold line in FIG. 30. A manner of connection between other parts is merely an example for description, and is not constructed as limitation. The bus may be classified into an address bus, a data bus, a control bus, and the like. For ease of denotation, the bus is represented by using only one bold line in FIG. 30, but it does not indicate that there is only one bus or only one type of bus.

The seventh memory 3003 in this embodiment of the present disclosure is configured to store program code executed by the seventh processor 3002, and may be a volatile memory, such as a random-access memory (RAM). Alternatively, the seventh memory 3003 may be a nonvolatile memory, such as a read-only memory (ROM), a flash memory, a hard disk drive (HDD), or a solid-state drive (SSD). Alternatively, the seventh memory 3003 is any other medium that can be used to carry or store expected program code in a command or data structure form and that can be accessed by a computer. However, this is not limited herein. The seventh memory 3003 may be a combination of the memories.

The seventh transceiver 3001 is configured to receive an application message reported by UE, where the application message carries an application layer protocol type of the UE.

The seventh processor 3002 is configured to determine, based on the application layer protocol type, a quantity of to-be-transmitted data packets that is corresponding to the application layer protocol type.

The seventh transceiver is configured to receive a data packet transmitted by the UE for the application layer protocol type.

The seventh processor is configured to: process the data packet transmitted by the UE for the application layer protocol type, record a quantity of processed data packets, and when determining that the recorded quantity of data packets reaches the quantity of to-be-transmitted data packets that is corresponding to the application layer protocol type, release an RRC connection between the RRC connection release device 3000 and the UE.

In conclusion, the UE sends the first message to the base station, where the first message carries the preset RRC release time determining parameter or the first RRC release time; if the UE adds the first RRC release time to the first message, the UE sets the timing duration of the first timer based on the first RRC release time, and starts the first timer; or if the UE adds the preset RRC release time determining parameter to the first message, the UE receives the response message fed back by the base station for the first message, where the response message carries the second RRC release time determined by the base station based on the preset RRC release time determining parameter, and the UE sets the timing duration of the first timer based on the second RRC release time, and starts the first timer; and the UE releases the RRC connection when the first timer expires. This greatly reduces signaling overheads in an RRC release process. The base station determines the timing duration of the second timer based on the first message, and sends, to the MME, the indication information that carries the timing duration of the second timer. The UE, the base station, and the MME respectively set the first timer, the second timer, and the third timer based on the RRC release time. When the UE determines that the first timer expires, the UE releases the RRC connection. When determining that the second timer expires, the base station releases the RRC connection between the base station and the UE. When determining that the third timer expires, the MME determines that the UE releases the RRC connection. This greatly reduces signaling overheads in an RRC release process.

The UE sends, to the base station, the first message that carries the indication information that indicates whether the UE needs to receive the downlink data. When the UE does not need to receive the downlink data, the UE sends the to-be-sent uplink data to the base station, and adds the endmarker indication packet to the last uplink data packet, and after sending the last uplink data packet, the UE releases the RRC connection. In addition, when determining, based on the indication information, that the UE does not need to receive the downlink data, after obtaining, by means of parsing, the endmarker indication packet included in the received uplink data packet, the base station releases the RRC connection between the base station and the UE. When the UE needs to receive the downlink data, the UE receives the downlink data after sending the to-be-sent uplink data, and after obtaining, by means of parsing, the endmarker indication packet included in the received downlink data packet, the UE releases the RRC connection. In addition, when determining, based on the indication information, that the UE needs to receive the downlink data, after sending, to the UE, the last downlink data packet that carries the endmarker indication packet, the base station releases the RRC connection between the base station and the UE. This greatly reduces signaling overheads in an RRC release process.

The UE reports, to the network side device, the application message that carries the application layer protocol type of the UE, and after exchanging, with the network side device, all the data packets required for application layer protocol type, the UE releases the RRC connection. The network side device determines, based on the application layer protocol type, the quantity of to-be-transmitted data packets that is corresponding to the application layer protocol type, and counts the data packets transmitted for the application layer protocol type, and when a counted number reaches the quantity of to-be-transmitted data packets that is corresponding to the application layer protocol type, the network side device releases the RRC connection between the network side device and the UE. This greatly reduces signaling overheads in an RRC release process.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product based on the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, a person skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A radio resource control (RRC) connection release method, comprising:
    sending, by user equipment (UE), a first message to a base station, wherein the first message carries a preset RRC release time determining parameter or a first RRC release time;
    when the UE adds the first RRC release time to the first message, setting, by the UE, timing duration of a first timer based on the first RRC release time, and starting the first timer; and
    when the UE adds the preset RRC release time determining parameter to the first message, receiving, by the UE, a response message fed back by the base station for the first message, wherein the response message carries a second RRC release time determined by the base station based on the preset RRC release time determining parameter, setting, by the UE, timing duration of the first timer based on the second RRC release time, and starting the first timer;
    reporting, by the UE, a buffer status report (BSR) to the base station for instructing the base station to adjust a timing duration of a second timer;
    receiving, by the UE, a first adjustment instruction returned by the base station, and adjusting the timing duration of the first timer based on the first adjustment instruction; and
    releasing, by the UE, an RRC connection when the first timer expires.

2. The method according to claim 1, wherein the preset RRC release time determining parameter is a volume of to-be-sent uplink data of the UE and/or an estimated time of sending the to-be-sent uplink data.

3. The method according to claim 1,
    wherein setting the timing duration of the second timer is set by the base station based on the first message sent by the UE.

4. A radio resource control (RRC) connection release method, comprising:
    receiving, by a base station, a first message sent by user equipment (UE), wherein the first message carries a preset RRC release time determining parameter or a first RRC release time;
    in response to determining that the first message carries the first RRC release time, setting, by the base station, timing duration of a second timer based on the first RRC release time, and starting the second timer;
    in response to determining that the first message carries the preset RRC release time determining parameter, determining, by the base station, a second RRC release time based on the preset RRC release time determining parameter, adding the second RRC release time to a response message fed back to the UE for the first message, setting, by the base station, timing duration of the second timer based on the second RRC release time, and starting the second timer;
    receiving, by the base station, a buffer status report (BSR) reported by the UE;
    adjusting, by the base station, the timing duration of the second timer based on the BSR;
    generating, by the base station, a first adjustment instruction and a second adjustment instruction based on a result of adjusting the timing duration of the second timer and returning the first adjustment instruction to the UE; and
    releasing, by the base station, an RRC connection between the base station and the UE when the second timer expires.

5. The method according to claim 4, wherein the preset RRC release time determining parameter is a volume of to-be-sent uplink data of the UE and/or an estimated time of sending the to-be-sent uplink data.

6. The method according to claim 4, wherein the method further comprises:
    notifying a mobility management entity (MME) of the second adjustment instruction.

7. The method according to claim 4, wherein after the base station feeds back the response message to the UE, the method further comprises:
    after receiving an acknowledgement message sent by the UE for the response message, sending, by the base station, S1 connection resume indication information to a mobility management entity (MME), wherein the S1 connection resume indication information carries the timing duration of the second timer;
    receiving, by the base station, S1 connection resume confirmation indication information sent by the MME; and
    determining, by the base station based on the S1 connection resume confirmation indication information, that an S1 connection between the base station and the MME is resumed.

8. A radio resource control (RRC) connection release apparatus, comprising:
- a transmitter configured to send a first message to a base station, wherein the first message carries a preset RRC release time determining parameter or a first RRC release time and to report a buffer status report (BSR) to the base station for instructing the base station to adjust timing duration of a second timer;
- a processor configured to:
  - when the first message carries the first RRC release time, set timing duration of a first timer based on the first RRC release time, and start the first timer, and
  - when the first message carries the preset RRC release time determining parameter, set timing duration of the first timer based on a second RRC release time, and start the first timer;
- a receiver configured to: when the first message carries the preset RRC release time determining parameter, receive a response message fed back by the base station for the first message, wherein the response message carries the second RRC release time determined by the base station based on the preset RRC release time determining parameter and to receive a first adjustment instruction returned by the base station;
- wherein the processor is further configured to, when the first adjustment instruction returned by the base station is received, adjust the timing duration of the first timer based on the first adjustment instruction; and
- wherein the processor is further configured to release an RRC connection when the first timer expires.

9. The apparatus according to claim 8, wherein the preset RRC release time determining parameter is a volume of to-be-sent uplink data of the apparatus and/or an estimated time of sending the to-be-sent uplink data.

10. The apparatus according to claim 8, wherein:
- the timing duration of the second timer is set by the base station based on the first message sent by the UE.

11. A radio release control (RRC) connection release apparatus, comprising:
- a receiver configured to receive a first message sent by user equipment (UE), wherein the first message carries a preset RRC release time determining parameter or a first RRC release time, and to receive a buffer status report (BSR) reported by the UE;
- a processor configured to:
  - when the first message carries the first RRC release time, set timing duration of a second timer based on the first RRC release time, and start the second timer, and
  - when the first message carries the preset RRC release time determining parameter, determine a second RRC release time based on the preset RRC release time determining parameter, set timing duration of the second timer based on the second RRC release time, and start the second timer;
- a transmitter configured to: when the first message carries the preset RRC release time determining parameter, feed back a response message to the UE for the first message, wherein the response message carries the second RRC release time; and
- wherein the processor is further configured to, when the BSR reported by the UE is received, adjust the timing duration of the second timer, and generate a first adjustment instruction and a second adjustment instruction based on a result of adjusting the timing duration of the second timer, and release an RRC connection between the RRC connection release apparatus and the UE when the second timer expires and to cause the transmitter to return the first adjustment instruction to the UE.

12. The apparatus according to claim 11, wherein the preset RRC release time determining parameter is a volume of to-be-sent uplink data of the UE and/or an estimated time of sending the to-be-sent uplink data.

13. The apparatus according to claim 11, wherein:
- the transmitter is further configured to: notify a mobility management entity (MME) of the second adjustment instruction.

14. The apparatus according to claim 11, wherein:
- the receiver is further configured to receive an acknowledgement message sent by the UE for the response message;
- the transmitter is further configured to: after the receiver receives the acknowledgement message sent by the UE for the response message, send S1 connection resume indication information to a mobility management entity (MME), wherein the S1 connection resume indication information carries the timing duration of the second timer;
- the receiver is further configured to receive S1 connection resume confirmation indication information sent by the MME; and
- the processor is further configured to determine, based on the S1 connection resume confirmation indication information, that an S1 connection between the base station and the MME is resumed.

* * * * *

UNITED STATES PATENT AND TRADEMARK OFFICE
CERTIFICATE OF CORRECTION

PATENT NO. : 10,694,576 B2
APPLICATION NO. : 16/015867
DATED : June 23, 2020
INVENTOR(S) : Le Yan et al.

It is certified that error appears in the above-identified patent and that said Letters Patent is hereby corrected as shown below:

In the Claims

In Claim 3, Column 40, Line 8, "wherein setting the timing duration....," delete the word "setting"

Signed and Sealed this
Twenty-fourth Day of November, 2020

Andrei Iancu
*Director of the United States Patent and Trademark Office*